US011249683B2

(12) United States Patent
Bai et al.

(10) Patent No.: US 11,249,683 B2
(45) Date of Patent: Feb. 15, 2022

(54) SIMULATED-ANNEALING BASED MEMORY ALLOCATIONS

(71) Applicant: Intel Corporation, Santa Clara, CA (US)

(72) Inventors: Yu Bai, Shewsbury, MA (US); Kermin Chofleming, Hudson, MA (US)

(73) Assignee: Intel Corporation, Santa Clara, CA (US)

(*) Notice: Subject to any disclaimer, the term of this patent is extended or adjusted under 35 U.S.C. 154(b) by 20 days.

(21) Appl. No.: 16/818,637

(22) Filed: Mar. 13, 2020

(65) Prior Publication Data

US 2020/0210113 A1    Jul. 2, 2020

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0683* (2013.01)

(58) Field of Classification Search
CPC ............ G06F 12/0811; G06F 12/0813; G06F 2209/501; G06F 2212/1024; G06F 3/0604; G06F 3/0631; G06F 3/0659; G06F 3/0683; G06F 9/5061
See application file for complete search history.

(56) References Cited

U.S. PATENT DOCUMENTS

| | | |
|---|---|---|
| 2018/0189231 A1 | 7/2018 | Fleming, Jr. et al. |
| 2019/0102338 A1 | 4/2019 | Tang et al. |
| 2021/0165589 A1* | 6/2021 | Heo ...................... G06F 3/0638 |

OTHER PUBLICATIONS

Extended European Search Report for European Application No. 20211474.0, dated May 27, 2021, 8 pages.

* cited by examiner

*Primary Examiner* — Yong J Choe
(74) *Attorney, Agent, or Firm* — Jordan IP Law, LLC

(57) ABSTRACT

Systems, apparatuses and methods may provide for technology that determines a plurality of memory operations associated with a data-flow graph that represents a computer code, where a spatial architecture executes the data-flow graph and the spatial architecture includes a plurality of memory controllers, randomly assigns one or more of the plurality of memory operations to one or more of the plurality of memory controllers to generate a first allocation of the plurality of memory operations to the memory controllers, and determines that the first allocation is to be stored as a permanent memory allocation based on a first performance metric associated with the first allocation.

25 Claims, 18 Drawing Sheets

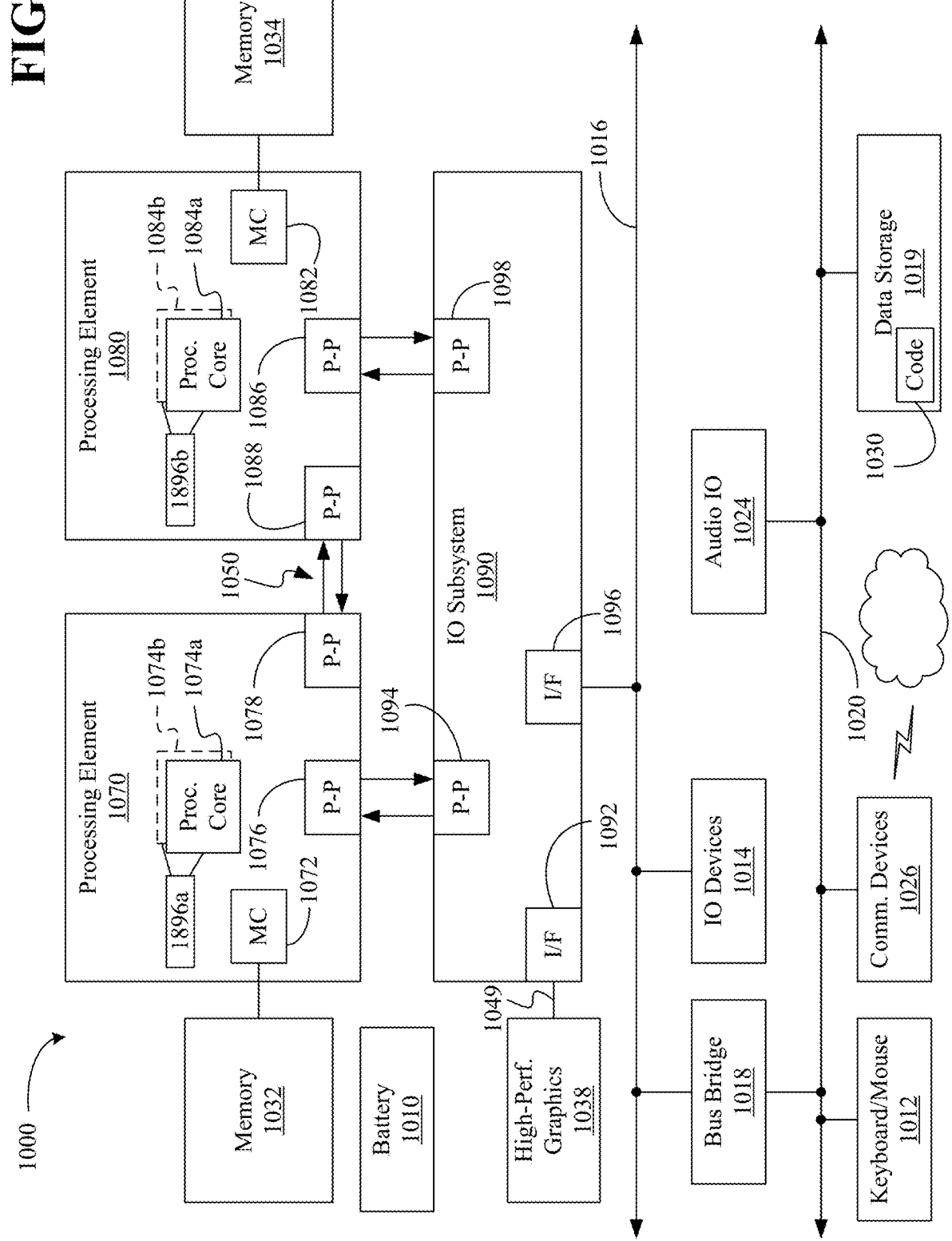

SIMULATED-ANNEALING BASED MEMORY ALLOCATIONS

TECHNICAL FIELD

Embodiments generally relate to efficiency enhanced implementations of memory allocations. More particularly, embodiments relate to assigning memory operations to spatial arrays to reduce memory latencies that may otherwise occur.

BACKGROUND

Computer code may be executable by a computing system. Such computer code may execute over various architectures and have a varying number of memory accesses points. Imbalance among such memory accesses points may delay the execution time increasing the latency of the execution of the computer code. For example, global resource allocation may become difficult to fairly balance and difficult to modify once implemented on an architecture. Further, some resource allocations may only consider one factor (e.g., issue counts) leading to less efficient designs. Thus, execution time can be lost due to contention in the memory sub-system.

BRIEF DESCRIPTION OF THE DRAWINGS

The various advantages of the embodiments will become apparent to one skilled in the art by reading the following specification and appended claims, and by referencing the following drawings, in which:

FIG. 16 is a block diagram of an example of a multi-processor based computing system according to an embodiment.

DESCRIPTION OF EMBODIMENTS

Figure 1:
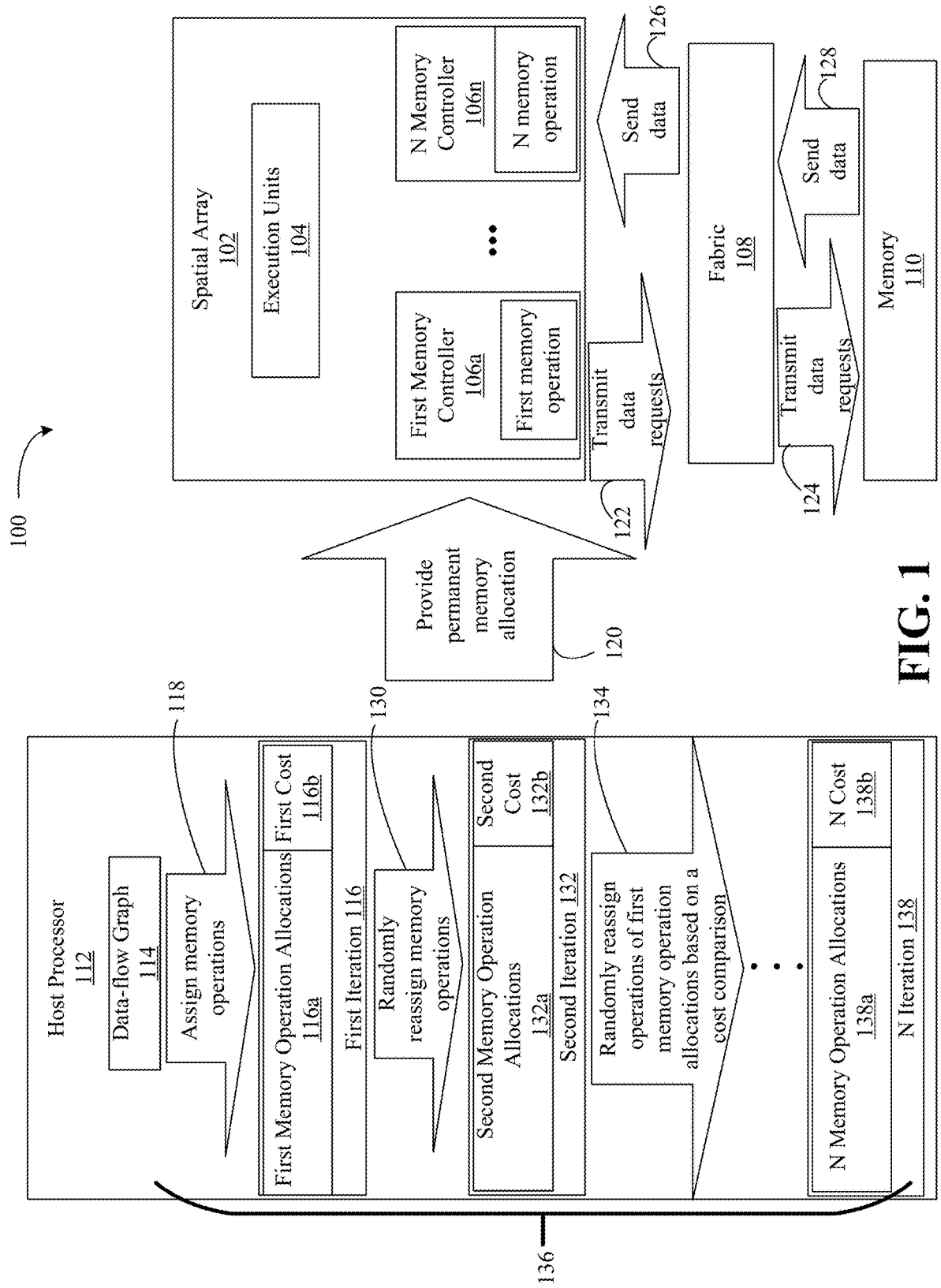
FIG. 1 is an example of an enhanced memory allocation process according to an embodiment.

FIG. 1 illustrates an enhanced memory allocation process 100. A computing system may include a host processor 112 and a spatial array 102. The spatial array 102 may be a graph-parallel architecture (e.g., parallel, distributed data-flow architecture such as an accelerator architecture and/or configurable spatial accelerator) including Field Programmable Gate Arrays (FPGAs), data flow processors, a configurable spatial array, processing elements (e.g., accelerators and operation specific units), coarse-grained reconfigurable architectures, etc. The programs in these parallel architectures may be in the form of graphs of parallel operations (e.g., graph nodes) and dependencies (edges connecting the graph nodes) as opposed to serial code. Thus, each graph node may be a particular operation of the program. In graph-parallel architectures, a program may be written in (or mapped to) the form of a data-flow graph 114 and mapped onto the spatial array 102 (as discussed in further detail below) in the form of parallel operations to enhance program execution time, reduce latency and distribute operations in an intelligent and efficient manner.

For example, the functions of the data-flow graph 114 may be assigned to a first memory controller 106a-N memory controller 106n of the spatial array 102. In particular, memory operations may be assigned to the first memory controller 106a-N memory controller 106n. The first memory controller 106a-N memory controller 106n may be "hardened," that is, directly implemented in silicon as opposed to having the corresponding functionality programmed into the spatial array, for example by being constituted as fixed-function hardware and/or FPGAs having dedicated hardware interfaces to control memory access requests and memory responses. Furthermore, the first memory controller 106a-N memory controller 106n may include memory interfaces that are configured to directly interface with internal fabrics (e.g., a network-on-chip fabrics) to enhance performance, energy, and/or area metrics. Such dataflow operations may be placed on shared resources (e.g., shared memory fabrics) in such a way that performance is maximized. As discussed above, global allocation of resources to various computer programs may be difficult. The first memory controller 106a-N memory controller 106n may control communications between the execution units 104 and the memory 110.

Some embodiments may enhance memory accesses to honor programs associated with data-flow graph 114, placement metrics and constraints through an intelligent search process, such as simulated-annealing process 136, to explore various allocations of operations to the first memory controller 106a-N memory controller 106n. A "best" (e.g., lowest cost) allocation may be identified and implemented on the spatial array 102 (e.g., a Configurable Spatial Architecture and/or FPGA architecture that includes FPGAs having programmable and fixed-function FPGAs functionalities). The combination of hard and soft functionalities may provide designers both design flexibilities and enhanced speed with the lower cost.

For example, a "best" allocation may be identified based on a cost function for projecting a performance of an assignment of memory resources (e.g., a specific allocation). The simulated annealing process 136 may calculate the cost of a specific allocation with the cost function. The lowest cost allocation may then be determined and applied on the spatial array 102. Thus, embodiments of the present application may enhance resource allocations (e.g., memory resources) to operations of the data-flow graph 114. The cost may be a performance metric that corresponds to an overall efficiency and performance level of a specific allocation.

For example, memory accesses may be decoupled into an explicit request and response phase to allow for pipelining through memory 110. Further, address generation portions of data-flow graph 114 may produce address accesses. This allows the spatial array 102 to drive high memory bandwidth. Further, the host processor 112 may compile the data-flow graph 114 to analyze, identify and observe the memory access stream of the data-flow graph 114 to reduce resource contention through an enhanced allocation the memory operations. Doing so may enhance execution times of the data-flow graph 114. For example, the host processor 112 may enhance memory associated resources in order to match an application's requirements and thus reach a low-latency performance goal.

The first memory controller 106a-N memory controller 106n may be a statically multiplexed and distributed structure, and thus memory operations of the data-flow graph 114 may be bound to first memory controller 106a-N memory controller 106n in a way to achieve efficient performance. In some embodiments, the memory operations are bound to the first memory controller 106a-N memory controller 106n for a lifetime of the execution of the data-flow graph 114. Thus, the host processor 112 may identify static and dynamic execution properties of the data-flow graph 114 and properties of the first memory controller 106a-N memory controller 106n (e.g., bid groups for memory resources) to allocate the memory operations so that each of the first memory controller 106a-N memory controller 106n has a plurality of memory operations.

For example, a cache interface of fabric 108 (e.g., Accelerator Cache Interface) endpoint may be provisioned with several request input queues. The first memory controller 106a-N memory controller 106n (e.g., request address files) may be divided into groups that each share one of these input queues into cache banks. By partitioning requestors into bid groups, collisions among the bid groups may be simultaneously buffered. This has the effect of smoothing collisions across time and enhancing bandwidth. In each clock cycle, one channel in each of the first memory controller 106a-N memory controller 106n may be arbitrated to the cache interface. The first memory controller 106a-N memory controller 106n may contend with one another ("bid groups") for injection into the cache interface. Thus, some embodiments may allocate the memory operations to enhance performance and reduce the occurrence of high latency memory accesses occurring at a single memory controller of the first memory controller 106a-N memory controller 106n.

For example, the host processor 112 may execute the simulated-annealing process 136 to generate first memory operation allocations 116a-N memory operation allocations 138a. The simulated-annealing process 136 may be advantageous in several ways. For example, the simulated-annealing process 136 allows a decision of a best memory operation allocation based on a combination of multiple cost functions (e.g., multiple levels of bandwidth for various aspects or applications) which may be simultaneously optimized. Second, the simulated-annealing process 136 allows a robust exploration of different options and/or design spaces. The simulated-annealing process 136 may also readily integrate with a conventional electronic design automation tools, such as those used in the production of FPGA or ASIC implementations.

For example, the host processor 112 may generate or receive the data-flow graph 114. The data-flow graph 114 may represent and correspond to a computer application and/or computer code. For example, the host processor 112 may compile the computer code. During the compilation, the host processor 112 may generate the data-flow graph 114, metadata related to dataflow graph 114, e.g. bandwidth estimates, and execute the simulated-annealing process 136.

The simulated-annealing process 136 may be an iterative process that identifies memory operations of the data-flow graph 114, and assigns the memory operations 118 to the first memory controller 106a-N memory controller 106n. For example, the simulated-annealing process 136 may be implement a probabilistic technique to identify the first memory operation allocations 116a-N memory allocations 136.

Initially, the memory operations may be one or more of randomly assigned or assigned based on probabilistic methods. The simulated-annealing process 136 may therefore generate first memory operation allocations 116a as part of a first iteration 116. The first memory operation allocations 116a may be an assignment of the memory operations of the data-flow graph 114 to the first memory controller 106a-N memory controller 106n. The simulated annealing process 136 may then calculate a first cost 116b of the first memory operation allocations 116a with a cost function. The cost function may determine the first cost 116b based on several different factors (e.g., place and route goals, wire lengths, bandwidth goals, etc.).

For example, the cost function may calculate a metric that indicates a performance (e.g., latency, power, execution time, etc.) of a respective memory operation allocation on the first memory controller 106a-N memory controller 106n. For example, a first cost function c1 may implement a simple scheduler, which models execution of the spatial array, and estimate execution cycles based on issue counts, completion buffers, and profiled or estimated memory latency. A second cost function c2 may be based on a maximum of request bandwidth and response bandwidth. Thus, the second cost function c2 may be a metric based on the maximum of request bandwidth and response bandwidth. Empirically, the total execution time is determined by the slowest (longest execution time) of the first memory controller 106a-N memory controller 106n. Thus, the cost function may guide the simulated-annealing process 136 to generate better allocations over time. As the cost function increases in precision, the probability of generating and identifying an optimal memory allocation may increase.

The first memory operation allocations 116a may be assigned as a permanent memory allocation. As described herein, permanent may mean for the lifetime of the data-flow graph 114 execution. As described herein, the permanent memory allocation may mean that the memory allocation is applied for the lifetime of the data-flow graph execution 114 specifically on the spatial array 102. The permanent memory allocation may be output to the spatial array 102 when the last iteration, which is the N iteration 138 in this example, of the simulated-annealing process 136 is completed.

The simulated-annealing process 136 may then randomly reassign (e.g., implement a move function) the memory operations 130 during a second iteration 132 to generate a second memory operation allocations 132a. That is, the simulated-annealing process 136 may reassign one or more of the memory operations that are assigned according to the first memory operation allocations 116a to generate the second memory operation allocations 132a. Thus, the second memory operation allocations 132a may be different from the first memory operation allocations 116a. The simulated-annealing process 136 may further generate a second cost 132b based on the second memory operation allocations 132a.

For example, a first move function may randomly choose two memory controllers of the first memory controller 106a-N memory controller 106n. A first of the two memory controllers may be assigned a first memory operation according to the first memory operation allocations 116a, while a second of the two memory controllers may be assigned a second memory operation according to the first memory operation allocations 116a. The first move function may randomly exchange the first and second memory operations between the two memory controllers to swap memory operations between the two memory controllers. The second memory operation allocations 132a may reflect the exchange. That is, the second memory operation allocations 132a may assign the second memory operation to the first of the two memory controllers while the first memory operation would be assigned to the second of the two memory controllers.

As a second example, a second move function may randomly select one memory operation. The second move function may then randomly select one memory controller of the first memory controller 106a-N memory controller 106n that the selected operation is unassigned to according to the first memory operation allocations 116a. The second move function may then move the selected operation to the selected one memory controller to generate the second memory operation allocations 132a. The second memory operation allocations 132a may reflect the exchange.

As a third example, a third move function may, for each respective memory controller of the first memory controller 106a-N memory controller 106n, calculate projected execution cycles based on profiling information, compiler hints, and workload knowledge. The third move function may select a slowest memory controller of the first memory controller 106a-N memory controller 106n with the longest projected execution time ("worst" memory controller). The third move function may randomly select one memory operation assigned to the slowest memory controller. The third move function may randomly choose a different memory controller from the first memory controller 106a-N memory controller 106n that is different from the slowest memory controller, and move the selected memory operation to the different memory controller.

It is worthwhile to note that different move functions may be implemented during different iterations. For example, the first move function may be implemented during the first iteration 116, while the third move function may be implemented at the N iteration 138.

The simulated annealing process 136 may randomly reassign operations of first memory operation allocations based on a cost comparison 134 and with one or more of the move functions described above. For example, during the second iteration 132, the simulated annealing process 136 may compare the first cost 116b of the first iteration 116 (e.g., a directly preceding iteration) and the second cost 132b of the second iteration 132 to each other. The comparison may indicate whether the modification of the second memory operation allocation 132a may enhance performance (e.g., is "better") or may detrimentally affect performance (e.g., is "worst") as compared to the first memory operation allocations 116a.

The second memory operation allocations 132a may be stored as the permanent memory allocation if the first cost 116b is higher than the second cost 132b. That is, the cost function described above may generate a cost that increases as performance worsens (e.g., a low cost indicates good performance while a high cost indicates a good performance). Thus, when the second cost 132b is lower than the first cost 116b, the projected performance of the second memory operation allocations 132a may enhance execution relative to the first memory operation allocations 116a. In contrast, when the second cost 132b is higher than the first cost 132b, the projected performance of the second memory operation allocations 132a may degrade execution relative to the first memory operation allocations 116a. In such a case, the first memory operation allocations 116a may be maintained as the permanent memory allocation.

In some embodiments, to circumvent the potential of being stuck at a local cost minima (not a global minima), some embodiments may allow a higher cost allocation (e.g., a memory operation allocation that has a higher cost than a previous memory operation allocation) to be stored even though the higher cost allocation is less efficient than the previous memory operation allocation. The probability of accepting the less efficient, higher cost allocation may be set by a variable referred to as "temperature." The temperature may decrease as the number of iterations increases thus decreasing the probability of accepting less efficient, higher cost allocations.

In the present example, the first cost 116b may be lower than the second cost 132b. Thus, the first memory operation allocations 116a may be maintained as the permanent memory allocation. Further, the second memory operation allocations 132a may be discarded. As such, the simulated-annealing process 136 may continue to execute based on the first memory operation allocations 116a and not the second memory operation allocations 132a.

The simulated-annealing process 136 may randomly reassign one or more memory operations stored in the permanent allocation. In the present example, the first memory operation allocations 116a (stored in the permanent allocation) is randomly reassigned based on a move operation to generate a third memory operation allocation and third cost (not illustrated), and continue to iteratively execute for a plurality of iterations. The permanent allocation may be updated and/or replaced as described above. As noted above, the simulated-annealing process 136 may further refer to the temperature for identifying when a less efficient, higher cost allocation is set as the permanent memory allocation instead of a lower cost, more efficient allocation. That is, the temperature may correspond to a search space. Thus, as the simulated-annealing process 136 progresses (iterations increase), steps within a search space are increased to more extensively explore the search space in a finer granularity since the simulated-annealing process 136 is approaching a viable (e.g., optimum) allocation, and it is less likely that a non-global (e.g., local) cost minima is being approached.

The simulated-annealing process 136 may finally determine a permanent memory allocation. For example, N cost 138b of N iteration 138 may be compared to another cost associated with the permanent memory allocation (e.g., a cost of a memory allocation stored in the permanent memory allocation). If the N cost 138b is lower than the another cost, the N memory operation allocation 138a may be set as the permanent memory allocation. Otherwise, the permanent memory allocation may be unchanged.

The simulated annealing process 136 may then conclude, and the permanent memory allocation 120 may be provided to the spatial array 102. As noted, the spatial array 102 may include a plurality of execution units 104. The execution units 104 may interface with the first memory controller 106a-N memory controller 106n to transmit memory requests and receive data in response to the memory requests. Each of the execution units 104 may interface with one or more of the first memory controller 106a-N memory controller 106n. While not shown, two networks (e.g., an NoC), such as a circuit switched network and/or a packet switched network, may connect the execution units 104 to the first memory controller 106a-N memory controller 106n.

The spatial array 102 may execute the data-flow graph based on the permanent memory allocation. For example, the permanent memory allocation may assign a memory operation to each respective memory controllers of the first memory controller 106a-N memory controller 106n. Thus, the first memory controller 106a may execute the first memory operation, while the N memory controller 106n may execute an N memory operation. As already described, the memory operations of the data-flow graph 114 may be assigned to achieve an efficient distribution of resources for execution of the data-flow graph 114.

The first memory controller 106a-N memory controller 106n may transmit data requests 122 to fabric 108. The fabric 108 may transmit the data requests 124 to the memory 110 (e.g., a memory, DRAM, hard-drive, solid-state drive, etc.). The memory 110 may send data 128 to the fabric 108 in response to the data requests. The fabric 108 may send the data 126 to the first memory controller 106a-N memory controller 106n, which in turn provide the data to the appropriate execution units 104 that issued the data requests.

It is also worthwhile to note that the cost function may include multiple cost functions that each correspond to a different data-flow graph (e.g., workload or application or aspects of the workload. For example, a plurality of applications may each provide a different data-flow graph. The simulated-annealing process 136 may determine individual costs for each data-flow graph based on a memory operation allocation, and determine a final cost for the memory operation allocation based on a function of the individual costs.

As noted above, the simulated-annealing process 136 approximates a global cost minimum in a large search space. A simulated-annealing based allocator that implements the simulated-annealing process 136 may be provided below:

| Pseudocode I |
|---|
| 1  Problem: looking for the memory allocation $R_{best}$ that provides the best performance level |
| 2  Initial memory allocation $R = R_0$, initial temperature T, outer steps S, initial inner steps $k_{max}$ |
| 3  For s = 0 through S |
| 4      If s >= 1, $k_{max}$ ← next_inner_annealing_steps ($k_{max}$) |
| 5      If s >= 1, T ← next temperature (T) |
| 6      For k = 0 through $k_{max}$ |
| 7          Pick the next memory allocation $R_{new}$ according to the move function move (R), i.e., $R_{new}$ = move (R) |
| 8              If cost ($R_{new}$) < cost ($R_{best}$), R ← $R_{new}$, $R_{best}$ ← $R_{new}$, $C_{best}$ = cost ($R_{new}$) |
| 9              Else R ← $R_{new}$ with some small probability p which is |

| Pseudocode I |
|---|
| determined by costs and temperature |
| 10  Output $R_{best}$ |

$R_{best}$ in the above example may correspond to a "permanent allocation." As is described above, there is an outer loop with the fixed steps S, from line 3 to the end. There is an inner loop, from line 6 to line 9, for each temperature point and its steps are from 0 to $k_{max}$. The temperature and the step may have different individual schedules. As the temperature cools down and decreases, steps are increased to more extensively explore the search space in the finer granularity since a global low cost solution is being approached. In each inner loop, a new allocation is chosen according to a move function and its cost (i.e., execution time projection) is evaluated. If its cost is lower, the new allocation is accepted. Otherwise, the new allocation may be rejected unless a small probability operation dictates that the new allocation is to be accepted at line 9 (to prevent remaining at local minimas).

Processing elements of the execution units 104 may be an array of simple computational elements such as arithmetic logic units (ALUs), general purpose computational elements, FPGAs, memory-based look-up tables, programmable gates, and/or specialized computational elements to consistently execute specific functions (e.g., add, multiply, subtract). Some general purpose computational elements may execute a variety of functions. The spatial array 102 may include processing cores (e.g., an array of processing cores). An array processing core may be an accelerator core in a system-on-chip.

Furthermore, while the host processor 112 is illustrated as being separated from the spatial array 102 (different processors), in some embodiments the configuration may be modified. For example, in some embodiments the spatial array 102 may execute some or all of the simulated-annealing process 136. In some embodiments, the host processor 112 may be replaced with a graphics processing unit (GPU) so that the GPU executes the simulated-annealing process 136. Depending on the configuration, the host processor 112 may be omitted all together, or may be remote to the spatial array 102. For example, the spatial array 102 may be at a first computing device (e.g., a user machine) and the host processor 112 may be at a second computing device (e.g., cloud connected to the user machine through the internet or other medium).

Figure 2:
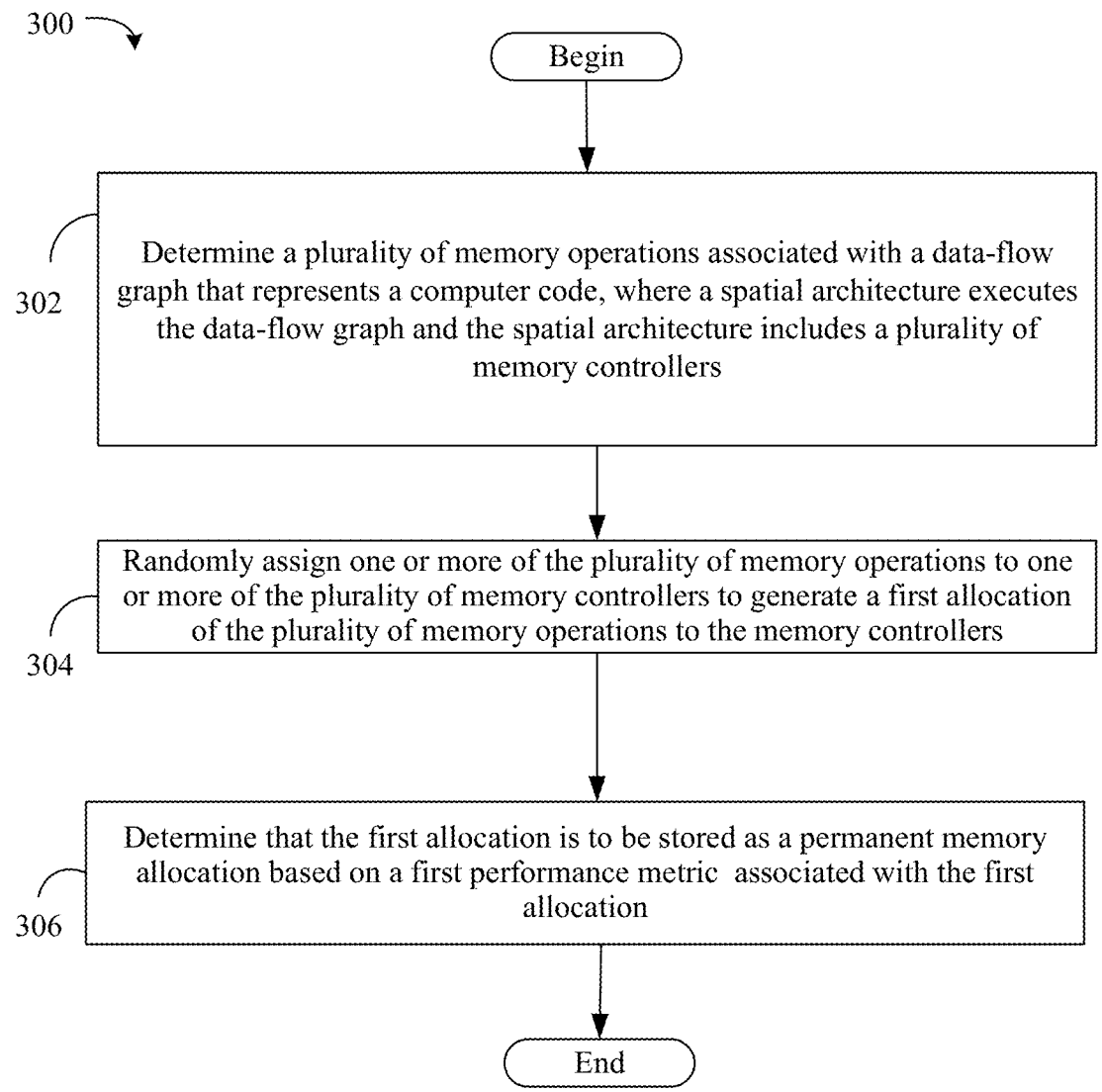
FIG. 2 is a flowchart of an example of a method of generating memory allocations according to an embodiment.

FIG. 2 shows a method 300 of generating memory allocations. In an embodiment, the method 300 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 determines a plurality of memory operations associated with a data-flow graph that represents a computer code, where a spatial architecture executes the data-flow graph and the spatial architecture includes a plurality of memory controllers. Illustrated processing block 304 randomly assigns one or more of the plurality of memory operations to one or more of the plurality of memory controllers to generate a first allocation of the plurality of memory operations to the memory controllers. Illustrated processing block 306 determines that the first allocation is to be stored as a permanent memory allocation based on a first performance metric associated with the first allocation.

Figure 3A:
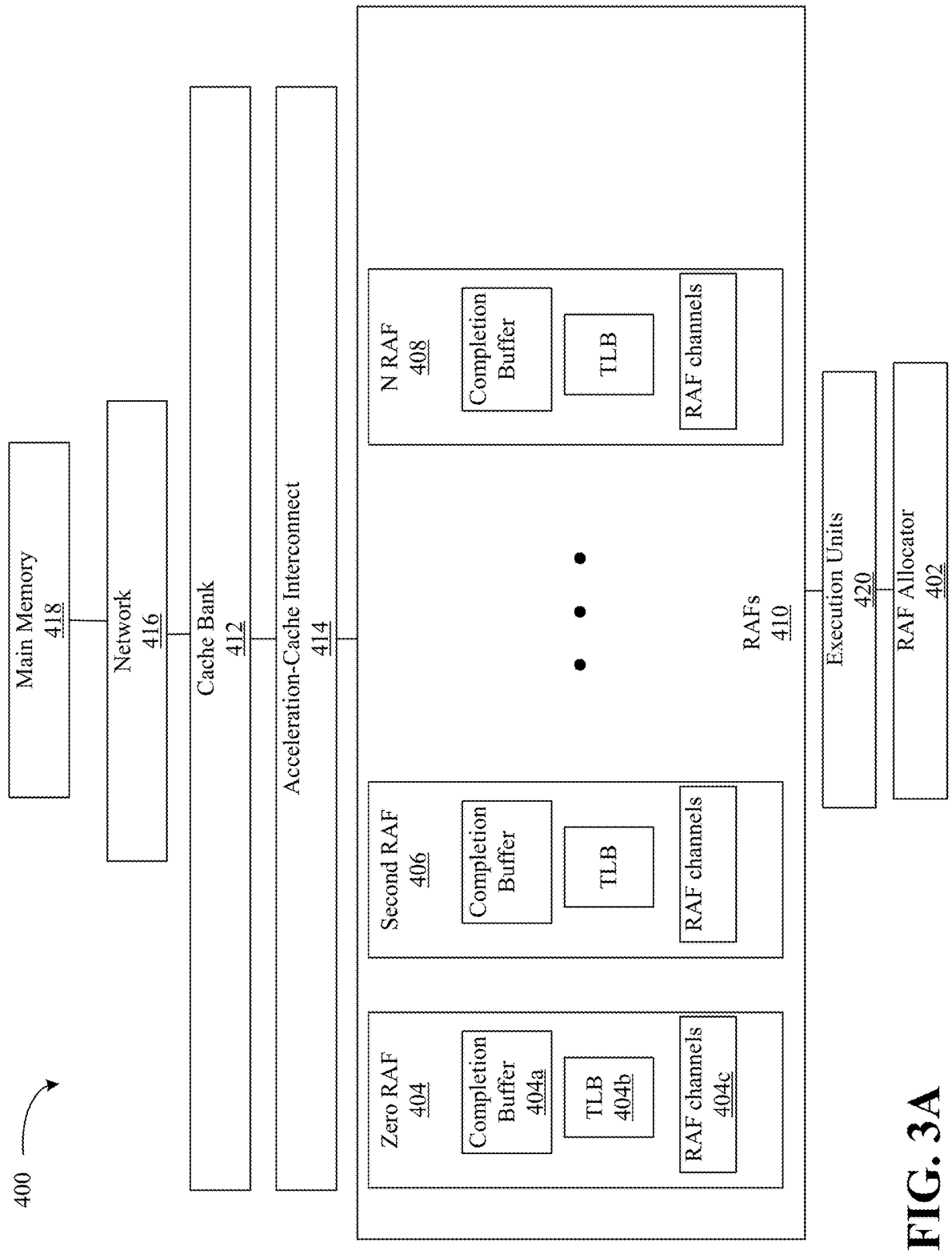
FIG. 3A shows an example of a system that includes a configurable spatial array according to an embodiment.

FIG. 3A shows an example of a system 400 that includes a spatial array that may be implemented as a configurable spatial array (CSA). FIG. 3A illustrates a high-level view of a memory sub-system of the CSA. The CSA may include the RAFs 410 (which may correspond to memory controllers), and execution units 420.

The RAFs 410 may be responsible for executing memory operations and serve as an intermediary between CSA fabric and a memory hierarchy including the main memory 418 and cache bank 412. The zero RAF 404 may include completion buffers 404a, a translation lookaside buffer 404b and RAF channels 404c. The second RAF 406 to N RAF 408 may include similar structures.

A RAF allocator 402 may correspond to compiler late tools and/or hardware that distribute memory operations to the execution units 420 based on a data-flow graph. The RAFs 410 may be connected to an acceleration-cache interconnect 414, and communicate with a cache bank 412 to retrieve data for the execution units 420. If data is not contained within the cache bank 412, a network 416 may be traversed to retrieve data from memory 418.

Figure 3B:
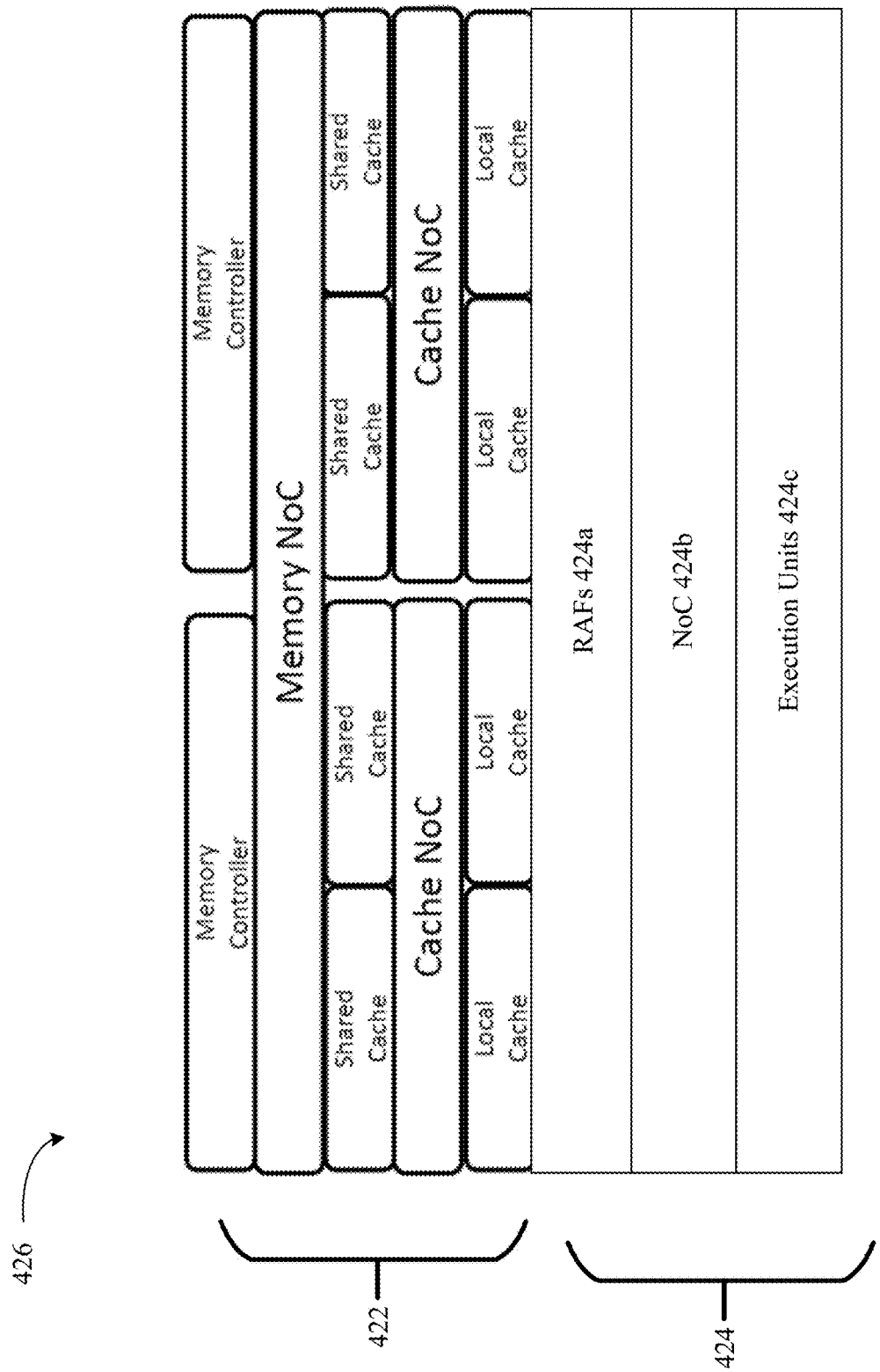
FIG. 3B shows an example of a memory hierarchy and configurable spatial array architecture according to an embodiment.
Figure 3C:
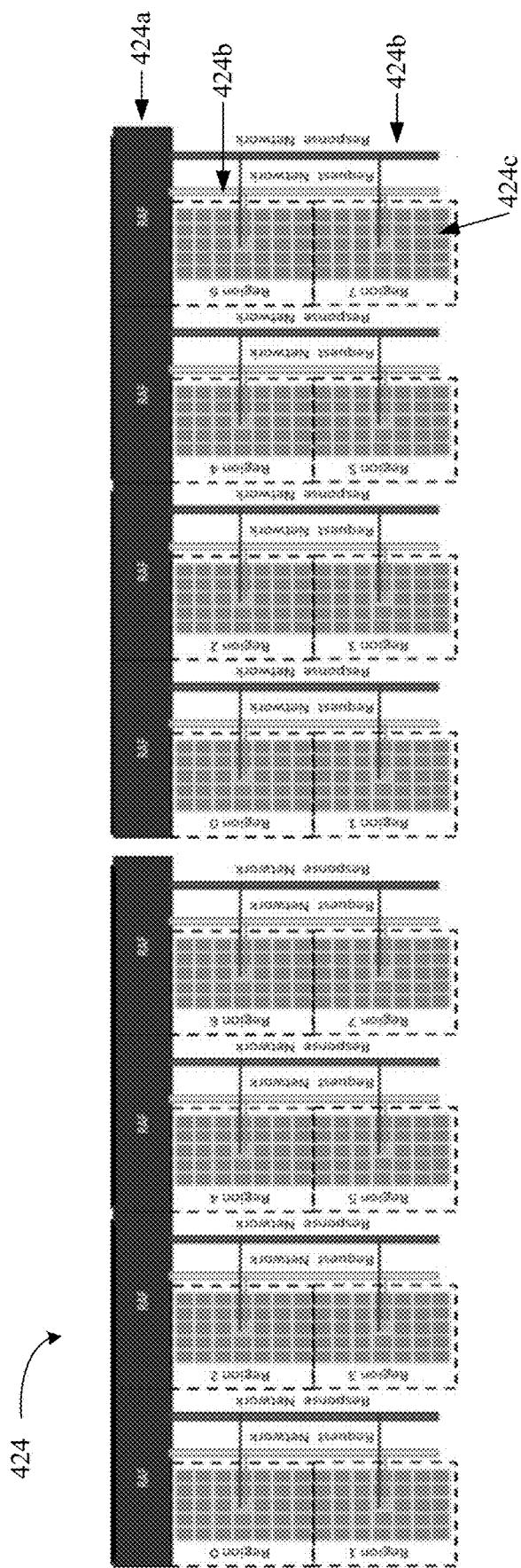
FIG. 3C shows an example of a more detailed example of the configurable spatial array according to an embodiment.

FIG. 3B illustrates a more detailed view of a computing architecture 426. As illustrated, a memory hierarchy 422 may be connected with a CSA 424 to provide data to the CSA 424. The CSA 424 may include RAFs 424a (which may correspond to memory controllers according to some embodiments), NoC 424b and execution units 424c. FIG. 3C illustrates the CSA 424 in more detail, including locations of the RAFs 424a, NOC 424b and execution units 424c.

Figure 4:
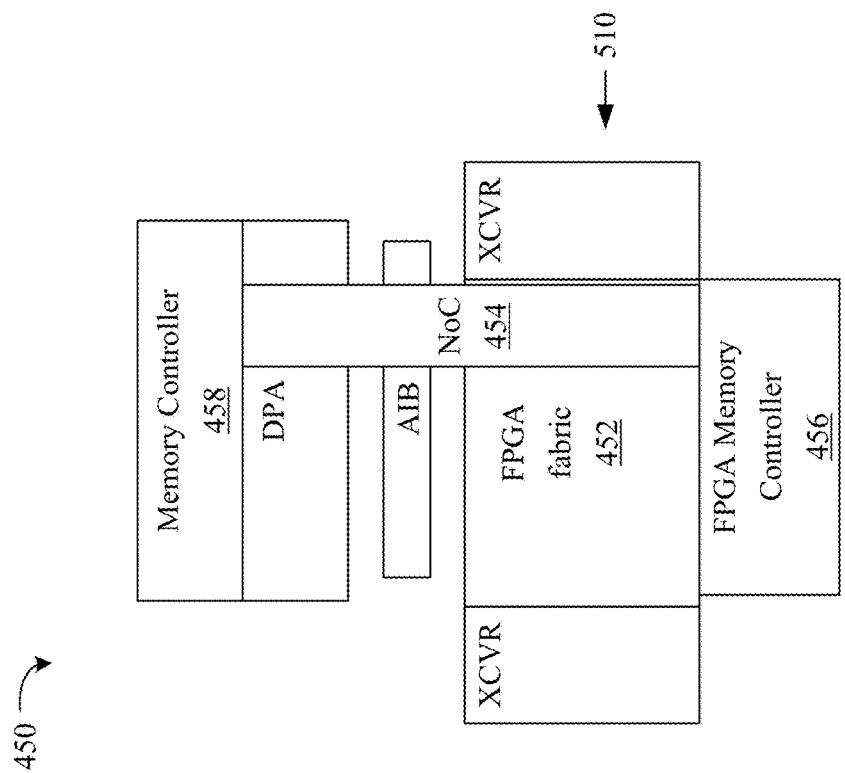
FIG. 4 shows an example of a field-programmable gate array and memory hierarchy according to an embodiment.

FIG. 4 illustrates an embodiment of an FPGA array 450 that may correspond to a spatial array according to some embodiments. As illustrated, the FPGA fabric 452 may include an NoC 454 to couple the FPGA memory controller 456 and the memory controller 458 to process memory requests. The memory controller 458 may access a cache hierarchy.

Figure 5:
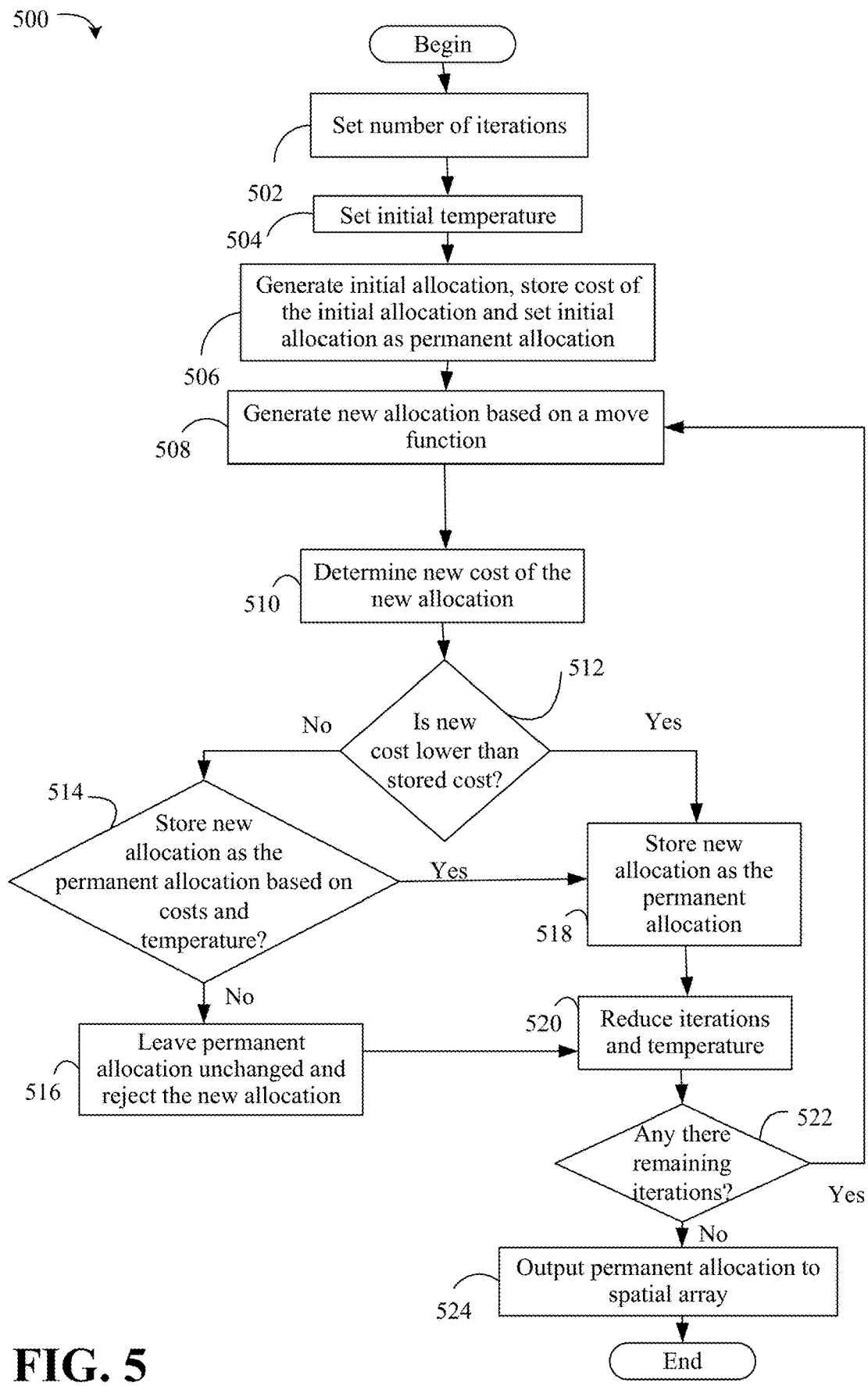
FIG. 5 is a flowchart of an example of a method of a simulated-annealing process according to an embodiment.

FIG. 5 shows a method 500 of identifying allocations for enhanced memory accesses (e.g., a simulated-annealing process). The method 500 may be readily implemented with any of the embodiments described herein. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 sets a number of iterations to search in a search space. As discussed above, the search space may contract as the iterations proceed and the method 500 becomes closer to identifying a global low cost allocation. Illustrated processing block 504 sets the initial temperature. As described above, the temperature may be a variable that dictates a size of the search space. Adjustment to the temperature (e.g., a decrease in the variable), may result in the search space becoming smaller. This is explained below in further detail.

Illustrated processing block 506 generates an initial allocation (e.g., a memory allocation for a data-flow graph execution), stores a cost of the initial allocation and sets the initial allocation as permanent allocation. The initial allocation may be randomly decided, or set based on parameters (e.g., Load-Balancing Longest-Job-First (LB LJF), Bandwidth-Balancing Longest-Job-First (Bandwidth-Balancing LJF), etc.). The cost may be calculated with any of the cost functions described herein.

Illustrated processing block 508 generates a new allocation based on the initial allocation and a move function. The new allocation may be a reassignment of allocations of the initial allocation based on the move function. The move function may be any of the move functions described herein.

Illustrated processing block 510 determines a new cost of the new allocation. The cost may be calculated with any of the cost functions described herein. Illustrated processing block 512 determines if the new cost (e.g., a first performance metric) is lower than the stored cost (e.g., a permanent performance metric). Since the present example considers the initial (first) iteration, the stored cost corresponds to the cost of the initial allocation.

If the new cost is not lower than the stored cost, illustrated processing block 514 determines whether to store the new allocation as the permanent allocation based on costs and temperatures. For example, processing block 514 determines whether to store the new allocation (despite the new allocation being less efficient than the allocation associated with the stored allocation) based on a probability determined by the temperature. The probability may be the likelihood that the new allocation is stored as the permanent allocation. The probability may be determined based on the stored cost, new cost and the temperature. As discussed above, illustrated processing block 514 may reduce the occurrences of remaining at local minimas during method 500. Doing so may broaden the search space. The temperature is reduced as the iterations proceed to compress the search space and reduce the probability of accepting less efficient allocations over more efficient allocations.

If illustrated processing block 514 determines that the new allocation should not be stored, illustrated processing block 516 leaves the permanent allocation unchanged and rejects the new allocation. Otherwise, illustrated processing block 518 stores the new allocation as the permanent allocations and in association with the new cost (e.g., the new cost is set as the "stored cost" which may also be referred to as a permanent performance metric).

Illustrated processing block 520 reduces the number of iterations (e.g., decrements by one) and the temperature (e.g., to reduce the probability of accepting new allocations that have higher costs than a permanent allocation and thereby reduce the search space). Illustrated processing block 522 determines if there are any remaining iterations.

If not, illustrated processing block 524 outputs the permanent allocation to a spatial architecture that is to execute the data-flow graph. Otherwise, illustrated processing block 508 may execute again to generate new allocation based on a move function and the permanent allocation (e.g., apply the move function to the permanent allocation to generate a new allocation).

It is worthwhile to note that the temperature may not be adjusted every iteration. Rather, the temperature may be adjusted after a number of the iterations execute (e.g., decrease the temperature every five iterations). Thus, in some embodiments a series of steps may be taken in a first sized search space dictated by the temperature. After a predetermined number of iterations execute, the temperature may be reduced to reduce the size of the search space (reduce the probability of accepting less efficient allocations). The smaller search space may be searched over a number of iterations and then the temperature may be reduced again.

In some embodiments, the temperature is reduced more slowly as the number of iterations increases. For example, the temperature may be reduced when the fifth iteration executes. The temperature may next be adjusted after the fifteenth iteration, and then adjusted again after the thirtieth iteration. Doing so may allow for enhanced and more granular searching as the method 500 proceeds. That is, it is less likely that a local minima will be reached as the method 500 proceeds, and so the possibility of accepting a higher cost allocation (less efficient allocation) may be reduced while executing more granular searches in a smaller search space.

Figure 6:
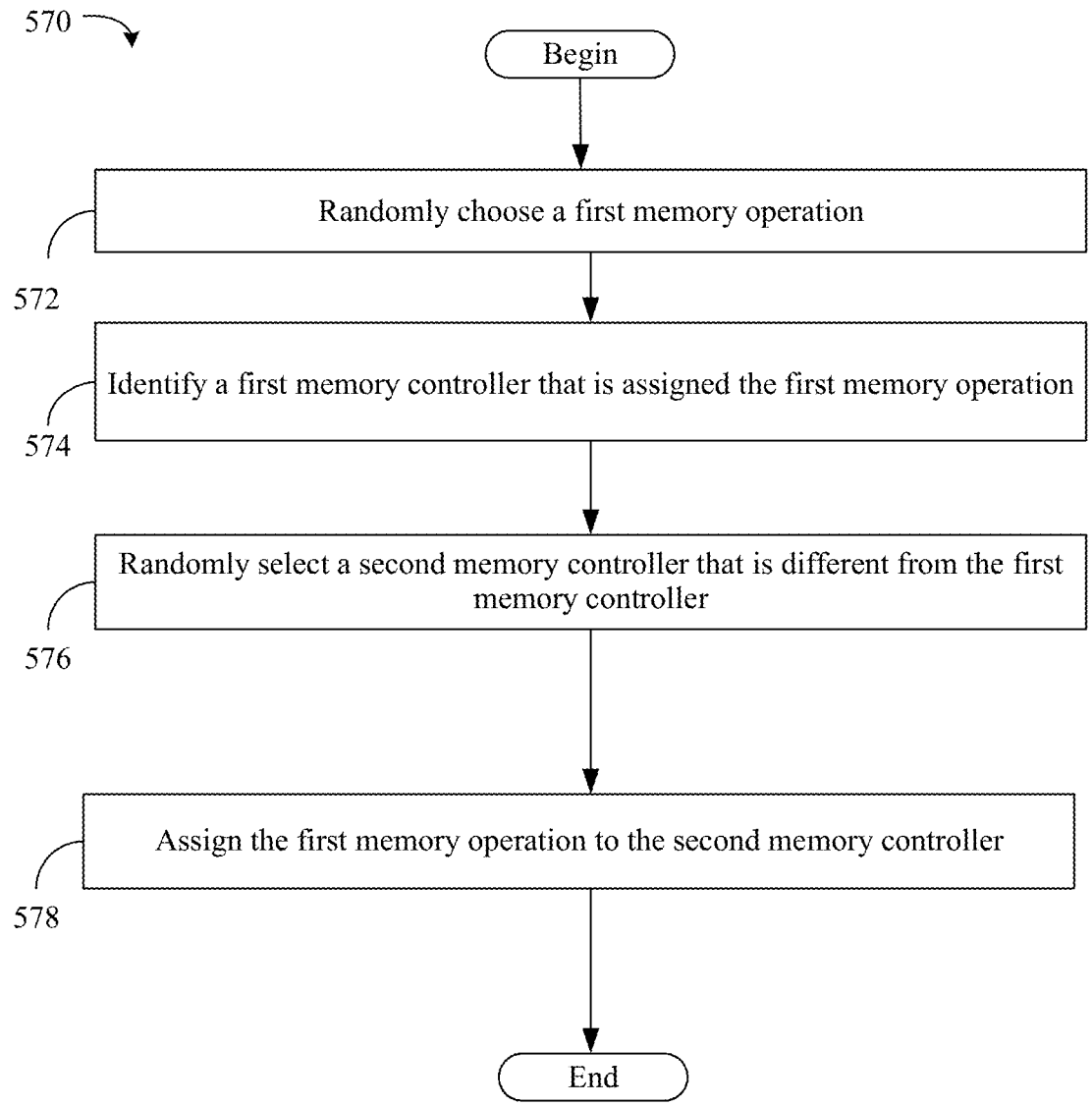
FIG. 6 is a flowchart of an example of a method of reassigning memory operations by selecting a random memory operation according to an embodiment.

FIG. 6 shows a method 570 of reassigning memory operations (e.g., a second move function) of a memory allocation. The method 570 may be readily implemented with any of the embodiments described herein. More particularly, the method 570 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 572 randomly chooses a first memory operation of the memory operations. Illustrated processing block 574 identifies a first memory controller that is assigned the first memory operation according to the memory allocation. Illustrated processing block 576 randomly selects a second memory controller that is different from the first memory controller. Illustrated processing block 578 assigns the first memory operation to the second memory controller to generate a new memory allocation.

Figure 7:
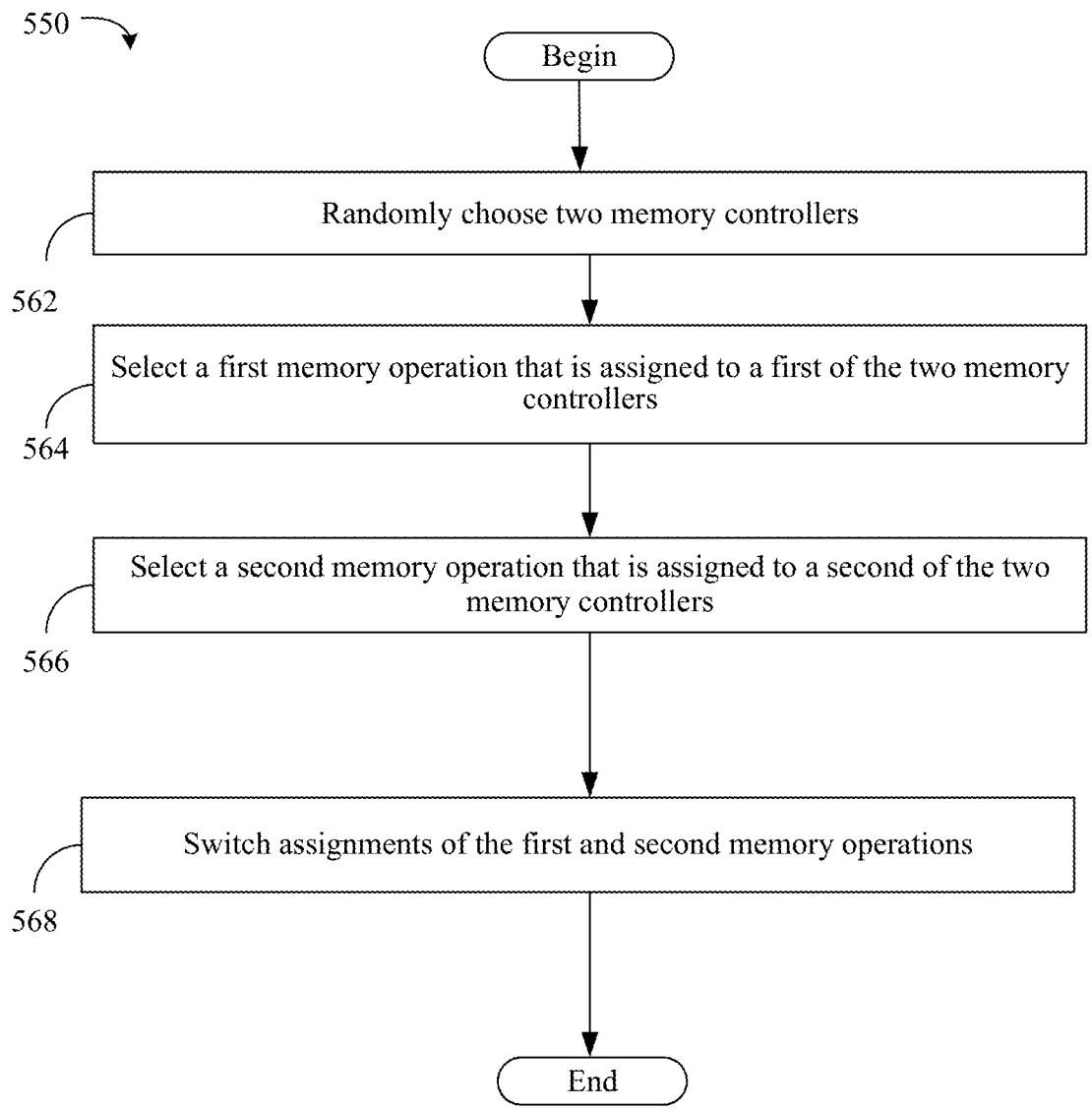
FIG. 7 is a flowchart of an example of a method of reassigning memory operations by selecting a random memory controller according to an embodiment.

FIG. 7 shows a method 550 of reassigning memory operations (e.g., a first move function) of a memory allocation. The method 550 may be readily implemented with any of the embodiments described herein. More particularly, the method 550 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 562 randomly chooses two memory controllers. Illustrated processing block 564 selects a first memory operation that is assigned to a first of the two memory controllers according to the memory allocation. Illustrated processing block 566 selects a second memory operation that is assigned to a second of the two memory controllers according to the memory allocation. Illustrated processing block 568 switches assignments of the first and second memory operations to generate a new memory allocations.

Figure 8:
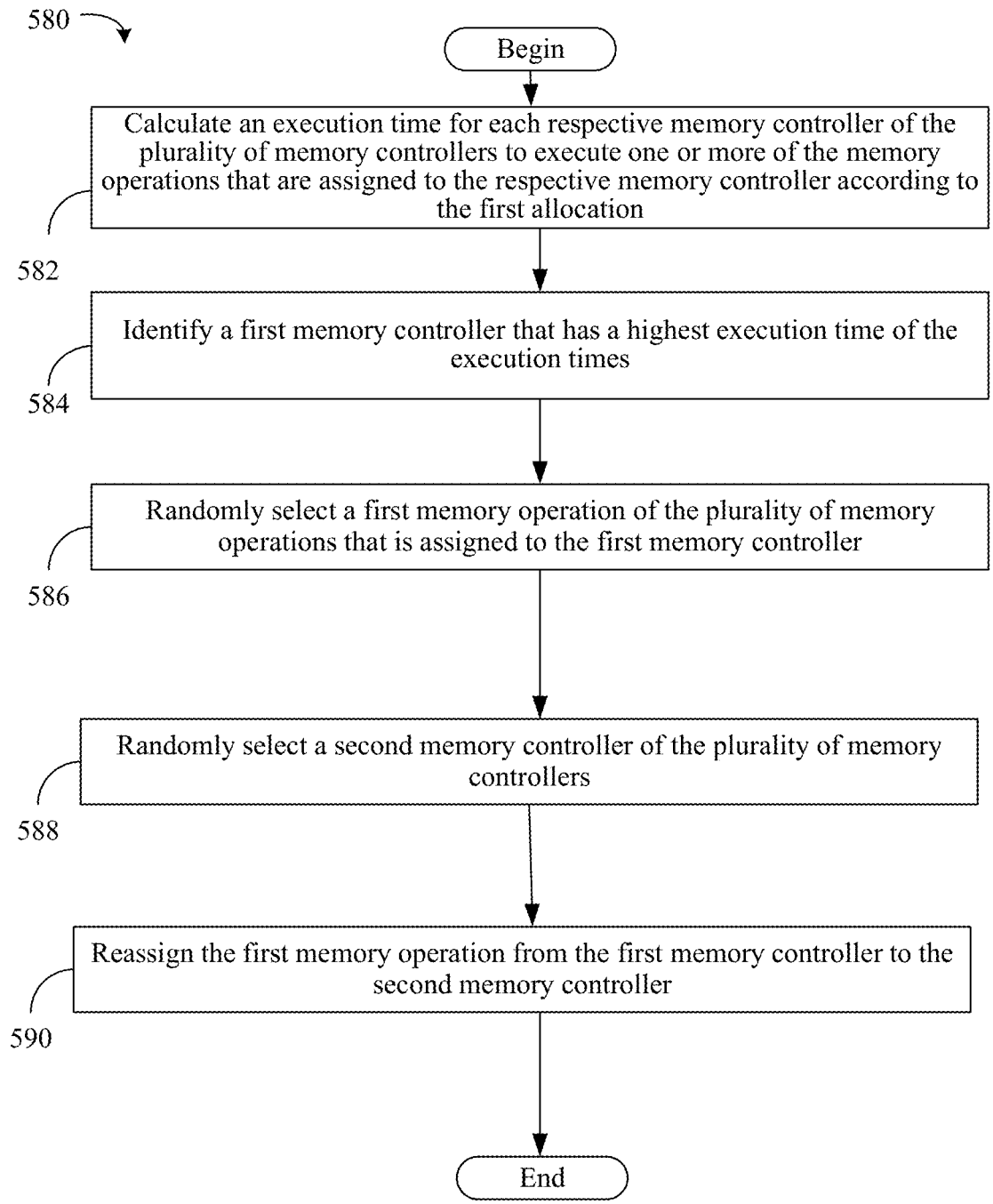
FIG. 8 is a flowchart of an example of a method of reassigning memory operations based on execution times according to an embodiment.

FIG. 8 shows a method 580 of randomly reassigning memory operations (e.g., a third move function) of a first memory allocation. The method 580 may be readily implemented with any of the embodiments described herein. More particularly, the method 580 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 582 calculates an execution time for each respective memory controller of the plurality of memory controllers to execute one or more of the memory operations that are assigned to the respective memory controller according to the first allocation. Illustrated processing block 584 identifies a first memory controller that has a highest execution time of the execution times. Illustrated processing block 586 randomly selects a first memory operation of the plurality of memory operations that is assigned to the first memory controller. Illustrated processing block 588 randomly selects a second memory controller of the plurality of memory controllers. Illustrated processing block 590 reassigns the first memory operation from the first memory controller to the second memory controller.

Figure 9:
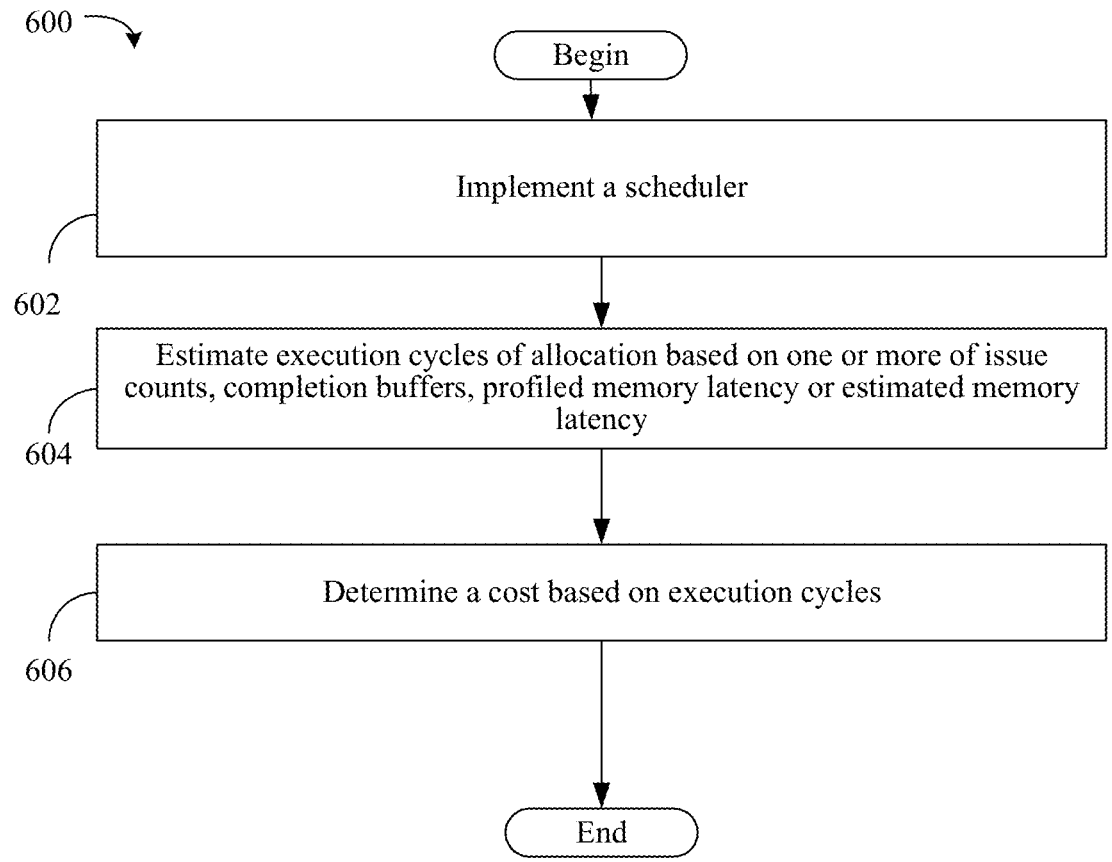
FIG. 9 is a flowchart of an example of a method of calculating a cost of a memory allocation based on execution cycles according to an embodiment.

FIG. 9 shows a method 600 of calculating a cost of a memory allocation. The method 600 may be readily implemented with any of the embodiments described herein. More particularly, the method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 602 implements a scheduler. Illustrated processing block 604 estimates execution cycles of the memory allocation based on one or more of issue counts, completion buffers, profiled memory latency or estimated memory latency. Illustrated processing block 606 determines a cost based on execution cycles.

Figure 10:
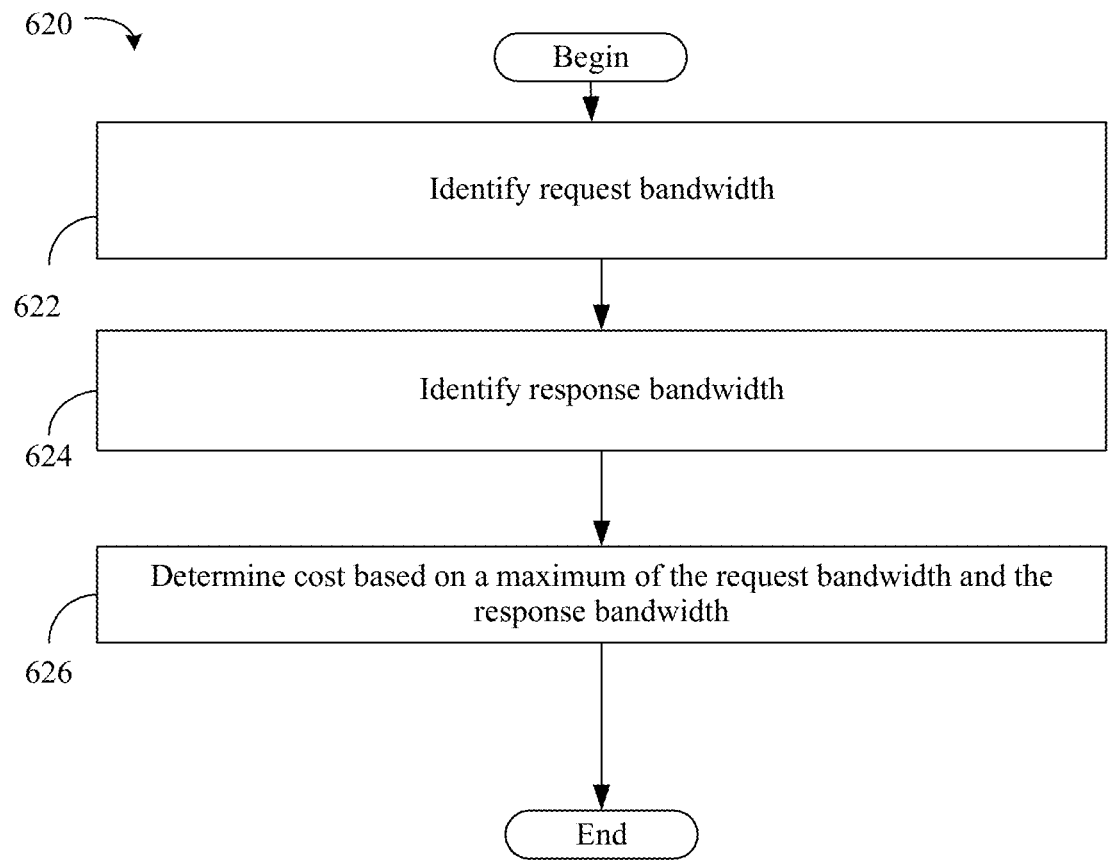
FIG. 10 is a flowchart of an example of a method of calculating a cost of a memory allocation based on response and request bandwidth according to an embodiment.

FIG. 10 shows a method 620 of calculating a cost of a memory allocation. The method 620 may be readily implemented with any of the embodiments described herein. More particularly, the method 620 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 622 identifies request bandwidth associated with implementation of the memory allocation a spatial architecture. Illustrated processing block 624 associated with implementation of the memory allocation on a spatial architecture. Illustrated processing block 626 determines cost based on a maximum of the request bandwidth and the response bandwidth.

Figure 11:
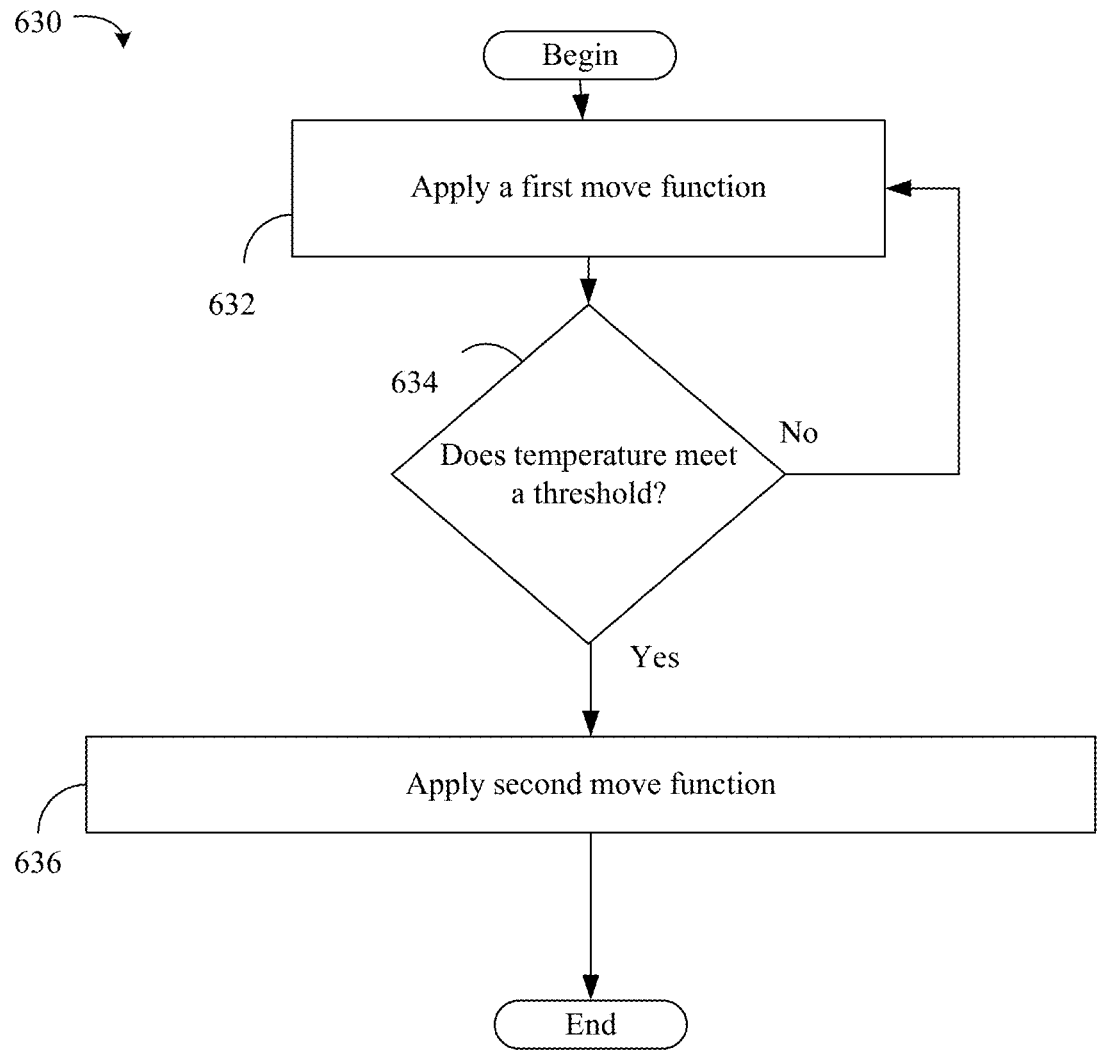
FIG. 11 is a flowchart of an example of a method of applying different reassignment policies based on response and request bandwidth according to an embodiment.

FIG. 11 shows a method 630 of applying different reassignment policies (e.g., different move functions) during a simulated-annealing process. The method 630 may be readily implemented with any of the embodiments described herein. More particularly, the method 630 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 632 applies a first move function. The first move function may correspond to any of the move functions described herein. Illustrated processing block 634 determines if a temperature of the simulated-annealing process meets a threshold. If so, illustrated processing block 636 applies a second move function (different from the first move function and may otherwise be any of the functions described herein) during the simulated-annealing process. Otherwise, the first move function is applied during the simulated-annealing process.

Figure 12:
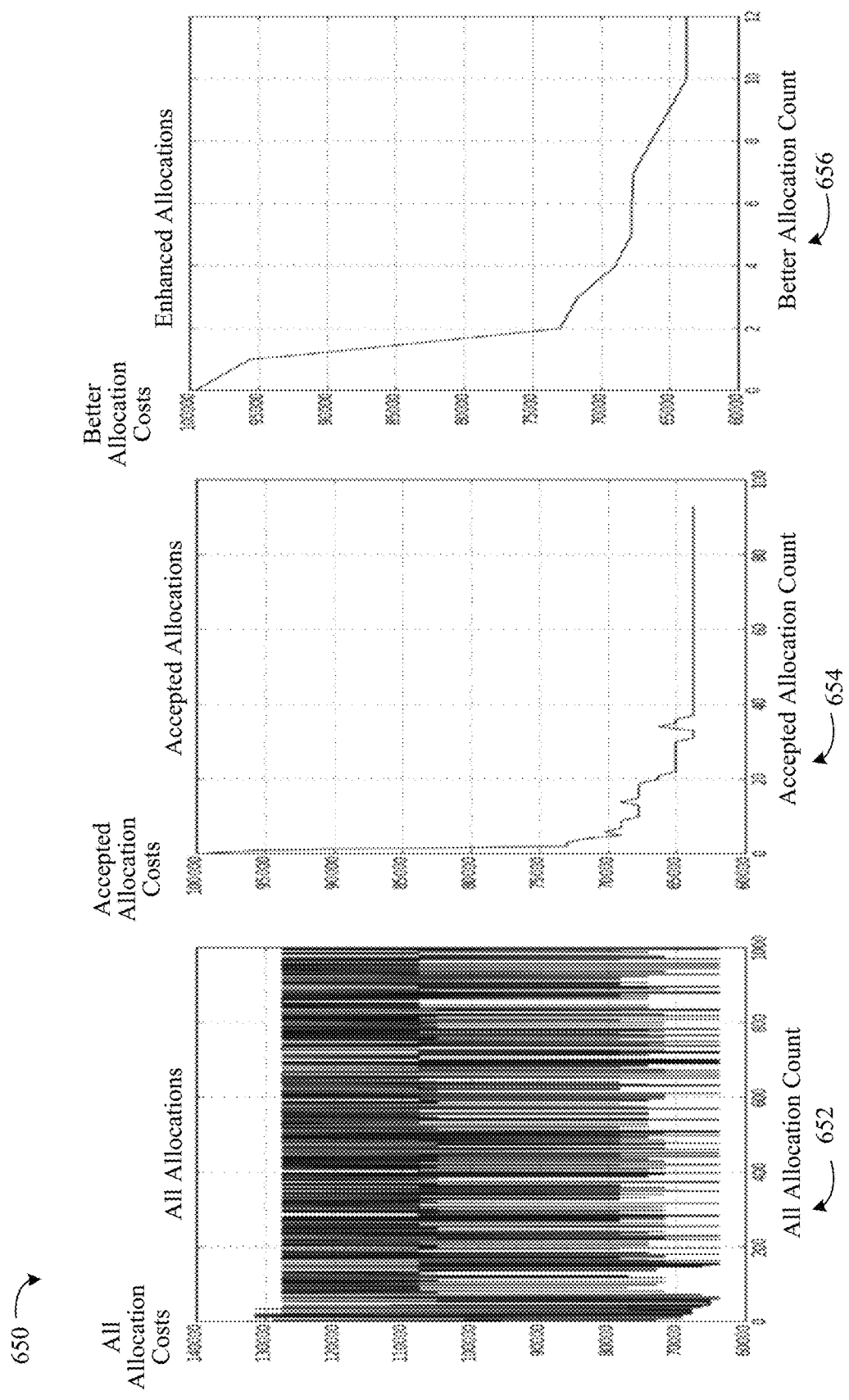
FIG. 12 is an example of a graphical representation of a simulated-annealing algorithm according to an embodiment.

FIG. 12 illustrates a graphical representation 650 of a simulated-annealing algorithm. All allocations 652 shows a cost of all memory (e.g., RAF) allocations. Approximately 1,000 iterations are executed (e.g., a simulated-annealing algorithm iterates around 1,000 times). Accepted allocations 654 shows costs of all accepted allocations which number 92 in total. The accepted allocations 654 includes allocations whose costs are lower than the previous minimum and a small number of allocations whose costs are higher. As is already explained, accepting worse allocations may avoid being stuck in a local optimum and determining a global optimum. As the simulated-annealing algorithm progresses, the probability of accepting a higher cost allocation is reduced and eventually becomes zero. Finally, enhanced allocations 656 illustrates the costs of all better allocations whose costs are lower than the previous minimum. Overall, the simulated-annealing algorithm finds the optimal allocation after 12 "better" allocations.

Figure 13:
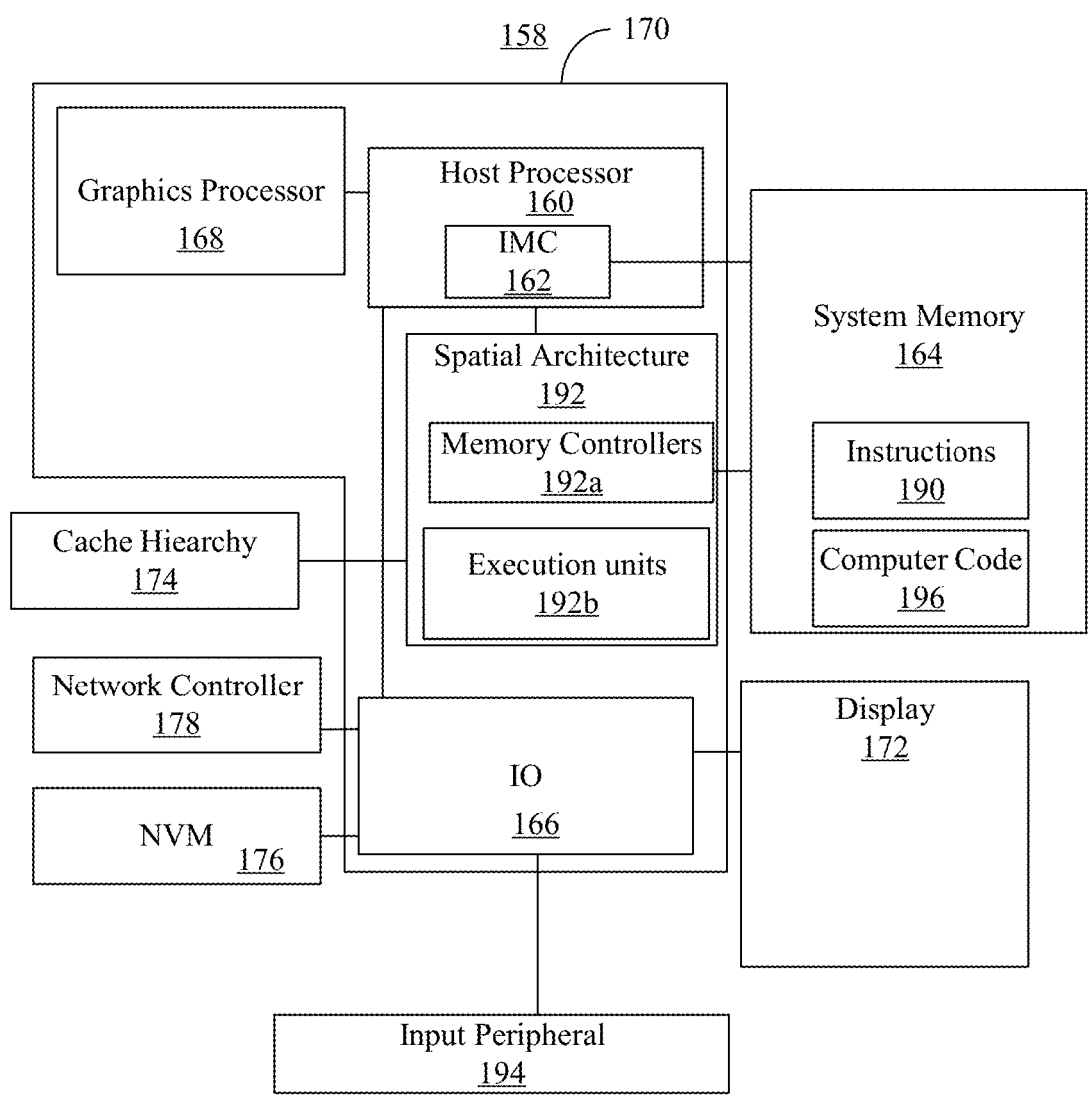
FIG. 13 is a block diagram of an example of a computing system according to an embodiment.

Turning now to FIG. 13, a memory access enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., a central processing unit with one or more processor cores) having an integrated memory controller (IMC) 162 that is coupled to a system memory 164

The illustrated system 158 also includes a graphics processor 168 (e.g., graphics processing unit/GPU) and an input output (IO) module 166 implemented together with the processor 160 (e.g., as microcontrollers) on a semiconductor die 170 as a system on chip (SOC), where the IO module 166 may communicate with, for example, a display 172 (e.g., touch screen, liquid crystal display/LCD, light emitting diode/LED display), a network controller 178 (e.g., wired and/or wireless), and mass storage 176 (e.g., HDD, optical disc, SSD, flash memory or other non-volatile memory/NVM).

The system memory 164 includes instructions 190 which when executed by one or more of the host processor 160 or graphics processor 168, cause the computing system 158 to perform one or more aspects of the one or more aspects of the enhanced memory allocation process 100 (FIG. 1), the method 300 (FIG. 2), the method 500 (FIG. 5), the method 570 (FIG. 6), the method 550 (FIG. 7), the method 580 (FIG. 8), the method 600 (FIG. 9), the method 620 (FIG. 620), the method 630 (FIG. 11), and any of the embodiments, already discussed, already discussed. The display 172 may present a graphical user interface. The graphical user interface may be associated with computer code 196. A user may execute a command through an input peripheral 194 (e.g., a mouse, keyboard, microphone, etc.) to cause the graphical user interface to execute the computer code 196.

The instructions 190 may cause one or more of the host processor 160 or the graphics processor 168 to compile the computer code 196 to determine a plurality of memory operations associated with a data-flow graph, determine a plurality of memory operations associated with the data-flow graph, randomly assign one or more of the plurality of memory operations to one or more of the plurality of memory controllers to generate a first allocation of the plurality of memory operations to the plurality of memory controllers, and determine whether to store the first allocation as a permanent memory allocation based on a first cost associated with the first allocation. During execution of the computer code 196, a spatial architecture 192 may access the system memory 164 and cache hierarchy 174 through memory controllers 192*a* and based on the permanent memory allocation. The memory controllers 192*a* may provide data to execution units 192*b*.

Figure 14:
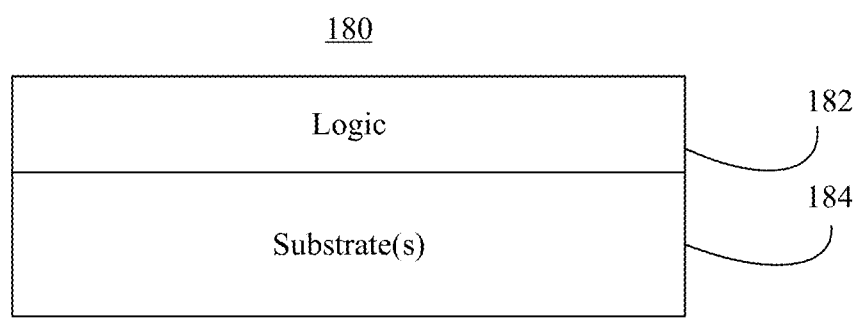
FIG. 14 is an illustration of an example of a semiconductor apparatus according to an embodiment.

FIG. 14 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of the enhanced memory allocation process 100 (FIG. 1), the method 300 (FIG. 2), the method 500 (FIG. 5), the method 570 (FIG. 6), the method 550 (FIG. 7), the method 580 (FIG. 8), the method 600 (FIG. 9), the method 620 (FIG. 620), the method 630 (FIG. 11), and any of the embodiments, already discussed, already discussed. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 15:
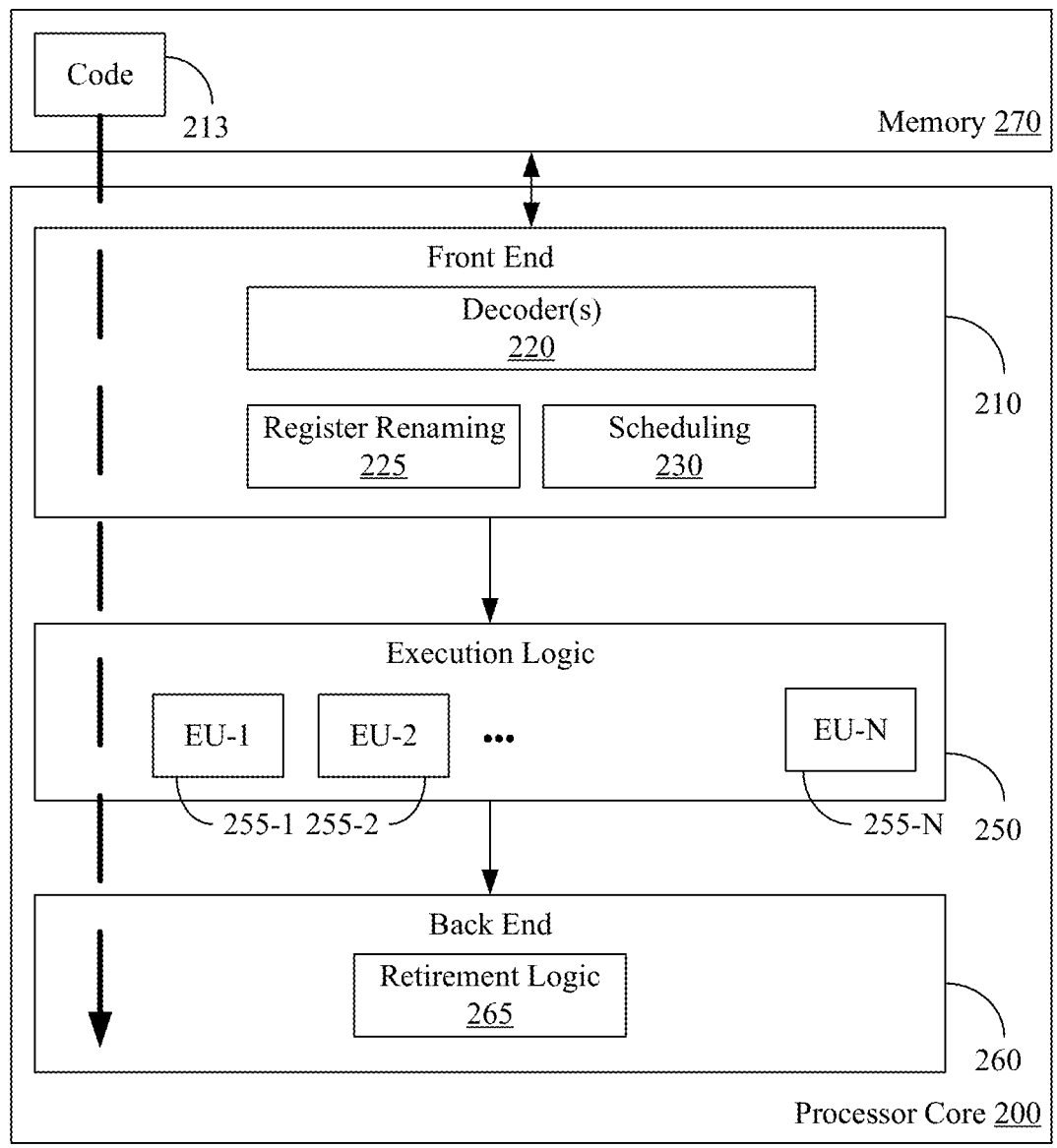
FIG. 15 is a block diagram of an example of a processor according to an embodiment.

FIG. 15 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 15, a processing element may alternatively include more than one of the processor core 200 illustrated in FIG. 15. The processor core 200 may be a single-threaded core or, for at least one embodiment, the processor core 200 may be multithreaded in that it may include more than one hardware thread context (or "logical processor") per core.

FIG. 15 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the enhanced memory allocation process 100 (FIG. 1), the method 300 (FIG. 2), the method 500 (FIG. 5), the method 570 (FIG. 6), the method 550 (FIG. 7), the method 580 (FIG. 8), the method 600 (FIG. 9), the method 620 (FIG. 620), the method 630 (FIG. 11), and any of the embodiments, already discussed, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 15, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 16, shown is a block diagram of a computing system 1000 embodiment in accordance with an embodiment. Shown in FIG. 16 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 16 may be implemented as a multi-drop bus rather than point-to-point interconnect.

As shown in FIG. 16, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 15.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070 of the processing elements 1070, 1080, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 16, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the enhanced memory allocation process 100 (FIG. 1), the method 300 (FIG. 2), the method 500 (FIG. 5), the method 570 (FIG. 6), the method 550 (FIG. 7), the method 580 (FIG. 8), the method 600 (FIG. 9), the method 620 (FIG. 620), the method 630 (FIG. 11), and any of the embodiments, already discussed, already discussed. Further, an audio I/O 1024 may be coupled to second bus 1020 and a battery 1010 may supply power to the computing system 1000.

Note that other embodiments are contemplated. For example, instead of the point-to-point architecture of FIG. 16, a system may implement a multi-drop bus or another such communication topology. Also, the elements of FIG. 16 may alternatively be partitioned using more or fewer integrated chips than shown in FIG. 16.

ADDITIONAL NOTES AND EXAMPLES

Example 1 includes a computing system comprising a cache to store data associated with execution of a computer code, a spatial architecture to execute a data-flow graph that is to represent the computer code, wherein the spatial architecture is to include a plurality of memory controllers that control communications between the spatial architecture and the cache, a host processor, and a memory including a set of instructions, which when executed by the host processor, cause the computing system to determine a plurality of memory operations associated with the data-flow graph, randomly assign one or more of the plurality of memory operations to one or more of the plurality of memory controllers to generate a first allocation of the plurality of memory operations to the plurality of memory controllers, and determine that the first allocation is to be stored as a permanent memory allocation based on a first performance metric associated with the first allocation.

Example 2 includes the computing system of example 1, wherein the instructions, when executed, cause the computing system to generate a second allocation of the plurality of memory operations to the memory controllers based on the first allocation and through a random selection of a first memory controller of the plurality of memory controllers and a second memory controller of the plurality of memory controllers, a reassignment of a first memory operation of the plurality of memory operations from the first memory controller to the second memory controller, and a reassignment of a second memory operation of the plurality of memory operations from the second memory controller to the first memory controller, and determine whether the second allocation is to be stored as the permanent memory allocation based on a comparison of the first performance metric to a second performance metric associated with the second allocation.

Example 3 includes the computing system of example 1, wherein the instructions, when executed, cause the computing system to generate a second allocation of the plurality of memory operations to the memory controllers based on the first allocation and through a random selection of a first memory operation of the plurality of memory operations, wherein the first memory operation is to be assigned to a first memory controller of the plurality of memory controllers, a random selection of a second memory controller of the plurality of memory controllers, and a reassignment of the first memory operation from the first memory controller to the second memory controller, and determine whether the second allocation is to be stored as the permanent memory allocation based on a comparison of the first performance metric to a second performance metric associated with the second allocation.

Example 4 includes the computing system of example 1, wherein the instructions, when executed, cause the computing system to generate a second allocation of the plurality of memory operations to the memory controllers based on the first allocation and through a calculation of an execution time for each respective memory controller of the plurality of memory controllers to execute one or more of the memory operations that are assigned to the respective memory controller according to the first allocation, identify a first memory controller of the plurality of memory controllers that has a highest execution time of the execution times, a random selection of a first memory operation of the plurality of memory operations that is assigned to the first memory controller, a random selection of a second memory controller of the plurality of memory controllers, and a reassignment of the first memory operation from the first memory controller to the second memory controller, and determine whether the second allocation is to be stored as the permanent memory allocation based on a comparison of the first performance metric to a second performance metric associated with the second allocation.

Example 5 includes the computing system of example 1, wherein the spatial architecture is to include one or more of a configurable spatial architecture or a field-programmable gate array architecture.

Example 6 includes the computing system of any one of examples 1-5, wherein the instructions, when executed, cause the computing system to execute a simulated-annealing process that is to include a generation of the first allocation, a determination of the first performance metric, a determination of a permanent performance metric associated with the permanent memory allocation, a determination that the first allocation is to be stored as the permanent memory allocation based on a comparison of the first performance metric to the permanent performance metric, and a determination that the first performance metric is to be stored as the permanent performance metric based on the comparison.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to determine a plurality of memory operations associated with a data-flow graph that is to represent a computer code, wherein a spatial architecture is to execute the data-flow graph and the spatial architecture is to include a plurality of memory controllers, randomly assign one or more of the plurality of memory operations to one or more of the plurality of memory controllers to generate a first allocation of the plurality of memory operations to the memory controllers, and determine that the first allocation is to be stored as a permanent memory allocation based on a first performance metric associated with the first allocation.

Example 8 includes the apparatus of example 7, wherein the logic coupled to the one or more substrates is to generate a second allocation of the plurality of memory operations to the memory controllers based on the first allocation and through a random selection of a first memory controller of the plurality of memory controllers and a second memory controller of the plurality of memory controllers, a reassignment of a first memory operation of the plurality of memory operations from the first memory controller to the second memory controller, and a reassignment of a second memory operation of the plurality of memory operations from the second memory controller to the first memory controller, and determine whether the second allocation is to be stored as the permanent memory allocation based on a comparison of the first performance metric to a second performance metric associated with the second allocation.

Example 9 includes the apparatus of example 7, wherein the logic coupled to the one or more substrates is to generate a second allocation of the plurality of memory operations to the memory controllers based on the first allocation and through a random selection of a first memory operation of the plurality of memory operations, wherein the first memory operation is to be assigned to a first memory controller of the memory controllers, a random selection of a second memory controller of the plurality of memory controllers, and a reassignment of the first memory operation from the first memory controller to the second memory controller, and determine whether the second allocation is to be stored as the permanent memory allocation based on a comparison of the first performance metric to a second performance metric associated with the second allocation.

Example 10 includes the apparatus of example 7, wherein the logic coupled to the one or more substrates is to generate a second allocation of the plurality of memory operations to the memory controllers based on the first allocation and through a calculation of an execution time for each respective memory controller of the plurality of memory controllers to execute one or more of the memory operations that are assigned to the respective memory controller according to the first allocation, identify a first memory controller of the plurality of memory controllers that has a highest execution time of the execution times, a random selection of a first memory operation of the plurality of memory operations that is assigned to the first memory controller, a random selection of a second memory controller of the plurality of memory controllers, and a reassignment of the first memory operation from the first memory controller to the second memory controller, and determine whether the second allocation is to be stored as the permanent memory allocation based on a comparison of the first performance metric to a second performance metric associated with the second allocation.

Example 11 includes the apparatus of example 7, wherein the spatial architecture is to include one or more of a configurable spatial architecture or a field-programmable gate array architecture.

Example 12 includes the apparatus of any one of examples 7-11, wherein the logic coupled to the one or more substrates is to execute a simulated-annealing process that is to include a generation of the first allocation, a determination of the first performance metric, a determination of a permanent performance metric associated with the permanent memory allocation, a determination that the first allocation is to be stored as the permanent memory allocation based on a comparison of the first performance metric to the permanent performance metric, and a determination that the first performance metric is to be stored as the permanent performance metric based on the comparison.

Example 13 includes the apparatus of any one of examples 7-11, wherein the logic coupled to the one or more substrates includes transistor channel regions that are positioned within the one or more substrates.

Example 14 includes at least one computer readable storage medium comprising a set of instructions, which when executed by a computing device, cause the computing device to determine a plurality of memory operations associated with a data-flow graph that is to represent a computer code, wherein a spatial architecture is to execute the data-flow graph and the spatial architecture is to include a plurality of memory controllers, randomly assign one or more of the plurality of memory operations to one or more of the plurality of memory controllers to generate a first allocation of the plurality of memory operations to the memory controllers, and determine that the first allocation is to be stored as a permanent memory allocation based on a first performance metric associated with the first allocation.

Example 15 includes the at least one computer readable storage medium of example 14, wherein the instructions, when executed, cause the computing device to generate a second allocation of the plurality of memory operations to the memory controllers based on the first allocation and through a random selection of a first memory controller of the plurality of memory controllers and a second memory controller of the plurality of memory controllers, a reassignment of a first memory operation of the plurality of memory operations from the first memory controller to the second memory controller, and a reassignment of a second memory operation of the plurality of memory operations from the second memory controller to the first memory controller, and determine whether the second allocation is to be stored as the permanent memory allocation based on a comparison of the first performance metric to a second performance metric associated with the second allocation.

Example 16 includes the at least one computer readable storage medium of example 14, wherein the instructions, when executed, cause the computing device to generate a second allocation of the plurality of memory operations to the memory controllers based on the first allocation and through a random selection of a first memory operation of the plurality of memory operations, wherein the first memory operation is to be assigned to a first memory controller of the plurality of memory controllers, a random selection of a second memory controller of the plurality of memory controllers, and a reassignment of the first memory operation from the first memory controller to the second memory controller, and determine whether the second allocation is to be stored as the permanent memory allocation based on a comparison of the first performance metric to a second performance metric associated with the second allocation.

Example 17 includes the at least one computer readable storage medium of example 14, wherein the instructions, when executed, cause the computing device to generate a second allocation of the plurality of memory operations to the memory controllers based on the first allocation and through a calculation of an execution time for each respective memory controller of the plurality of memory controllers to execute one or more of the memory operations that are assigned to the respective memory controller according to the first allocation, identify a first memory controller of the plurality of memory controllers that has a highest execution time of the execution times, a random selection of a first memory operation of the plurality of memory operations that is assigned to the first memory controller, a random selection of a second memory controller of the plurality of memory controllers, and a reassignment of the first memory operation from the first memory controller to the second memory controller, and determine whether the second allocation is to be stored as the permanent memory allocation based on a comparison of the first performance metric to a second performance metric associated with the second allocation.

Example 18 includes the at least one computer readable storage medium of example 14, wherein the spatial architecture is to include one or more of a configurable spatial architecture or a field-programmable gate array architecture.

Example 19 includes the at least one computer readable storage medium of any one of examples 14-18, wherein the instructions, when executed, cause the computing device to execute a simulated-annealing process that is to include a generation of the first allocation, a determination of the first performance metric, a determination of a permanent performance metric associated with the permanent memory allocation, a determination that the first allocation is to be stored as the permanent memory allocation based on a comparison of the first performance metric to the permanent performance metric, and a determination that the first performance metric is to be stored as the permanent performance metric based on the comparison.

Example 20 includes a method comprising determining a plurality of memory operations associated with a data-flow graph that represents a computer code, wherein a spatial architecture executes the data-flow graph and the spatial architecture includes a plurality of memory controllers, randomly assigning one or more of the plurality of memory operations to one or more of the plurality of memory controllers to generate a first allocation of the plurality of memory operations to the memory controllers, and determining that the first allocation is to be stored as a permanent memory allocation based on a first performance metric associated with the first allocation.

Example 21 includes the method of example 20, further comprising generating a second allocation of the plurality of memory operations to the memory controllers based on the first allocation, wherein the generating the second allocation includes randomly selecting a first memory controller of the plurality of memory controllers and a second memory controller of the plurality of memory controllers, reassigning a first memory operation of the plurality of memory operations from the first memory controller to the second memory controller, and reassigning a second memory operation of the plurality of memory operations from the second memory controller to the first memory controller, and determining whether the second allocation is to be stored as the permanent memory allocation based on a comparison of the first performance metric to a second performance metric associated with the second allocation.

Example 22 includes the method of example 20, further comprising generating a second allocation of the plurality of memory operations to the memory controllers based on the first allocation, wherein the generating the second allocation includes randomly selecting a first memory operation of the plurality of memory operations, wherein the first memory operation is to be assigned to a first memory controller of the plurality of memory controllers, randomly selecting a second memory controller of the plurality of memory controllers, and reassigning the first memory operation from the first memory controller to the second memory controller, and determining whether the second allocation is to be stored as the permanent memory allocation based on a comparison of the first performance metric to a second performance metric associated with the second allocation.

Example 23 includes the method of example 20, further comprising generating a second allocation of the plurality of memory operations to the memory controllers based on the first allocation, wherein the generating the second allocation includes calculating an execution time for each respective memory controller of the plurality of memory controllers to execute one or more of the memory operations that are assigned to the respective memory controller according to the first allocation, identifying a first memory controller of the plurality of memory controllers that has a highest execution time of the execution times, randomly selecting a first memory operation of the plurality of memory operations that is assigned to the first memory controller, randomly selecting a second memory controller of the plurality of memory controllers, and reassigning the first memory operation from the first memory controller to the second memory controller, and determining whether the second allocation is to be stored as the permanent memory allocation based on a comparison of the first performance metric to a second performance metric associated with the second allocation.

Example 24 includes the method of example 20, wherein the spatial architecture is to include one or more of a configurable spatial architecture or a field-programmable gate array architecture.

Example 25 includes the method of any one of examples 20-24, the method further comprising executing a simulated-annealing process that is to include a generation of the first allocation, a determination of the first performance metric, a determination of a permanent performance metric associated with the permanent memory allocation, a determination that the first allocation is to be stored as the permanent memory allocation based on a comparison of the first performance metric to the permanent performance metric, and a determination that the first performance metric is to be stored as the permanent performance metric based on the comparison.

Example 26 includes a semiconductor apparatus comprising means for determining a plurality of memory operations associated with a data-flow graph that represents a computer code, wherein a spatial architecture executes the data-flow graph and the spatial architecture includes a plurality of memory controllers, means for randomly assigning one or more of the plurality of memory operations to one or more of the plurality of memory controllers to generate a first allocation of the plurality of memory operations to the memory controllers, and means for determining that the first allocation is to be stored as a permanent memory allocation based on a first performance metric associated with the first allocation.

Example 27 includes the apparatus of example 26, further comprising means for generating a second allocation of the plurality of memory operations to the memory controllers based on the first allocation, wherein the means for generating the second allocation include means for randomly selecting a first memory controller of the plurality of memory controllers and a second memory controller of the plurality of memory controllers, means for reassigning a first memory operation of the plurality of memory operations from the first memory controller to the second memory controller, and means for reassigning a second memory operation of the plurality of memory operations from the second memory controller to the first memory controller, and means for determining whether the second allocation is to be stored as the permanent memory allocation based on a comparison of the first performance metric to a second performance metric associated with the second allocation.

Example 28 includes the apparatus of example 26, further comprising means for generating a second allocation of the plurality of memory operations to the memory controllers based on the first allocation, wherein the means for generating the second allocation includes means for randomly selecting a first memory operation of the plurality of memory operations, wherein the first memory operation is to be assigned to a first memory controller of the plurality of memory controllers, means for randomly selecting a second memory controller of the plurality of memory controllers, and means for reassigning the first memory operation from the first memory controller to the second memory controller, and means for determining whether the second allocation is to be stored as the permanent memory allocation based on a comparison of the first performance metric to a second performance metric associated with the second allocation.

Example 29 includes the apparatus of example 26, further comprising means for generating a second allocation of the plurality of memory operations to the memory controllers based on the first allocation, wherein the means for generating the second allocation includes means for calculating an execution time for each respective memory controller of the plurality of memory controllers to execute one or more of the memory operations that are assigned to the respective memory controller according to the first allocation, means for identifying a first memory controller of the plurality of memory controllers that has a highest execution time of the execution times, means for randomly selecting a first memory operation of the plurality of memory operations that is assigned to the first memory controller, means for randomly selecting a second memory controller of the plurality of memory controllers, and means for reassigning the first memory operation from the first memory controller to the second memory controller, and means for determining whether the second allocation is to be stored as the permanent memory allocation based on a comparison of the first performance metric to a second performance metric associated with the second allocation.

Example 30 includes the apparatus of example 26, wherein the spatial architecture is to include one or more of a configurable spatial architecture or a field-programmable gate array architecture.

Example 31 includes the apparatus of any one of examples 26-30, further comprising means for executing a simulated-annealing process that is to include a means for generating of the first allocation, a means for determination of the first performance metric, a means for determining of a permanent performance metric associated with the permanent memory allocation, a means for determining that the first allocation is to be stored as the permanent memory allocation based on a comparison of the first performance metric to the permanent performance metric, and a means for determining that the first performance metric is to be stored as the permanent performance metric based on the comparison.

Thus, technology described herein may support less latency prone memory accesses that may execute on a spatial array. The technology may also enable a simpler, more efficient, and less latency prone execution of operations.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a cache to store data associated with execution of a computer code;
   a spatial architecture to execute a data-flow graph that is to represent the computer code, wherein the spatial architecture is to include a plurality of memory controllers that control communications between the spatial architecture and the cache, wherein the plurality of memory controllers includes a first memory controller and a second memory controller;
a host processor; and
a memory including a set of instructions, which when executed by the host processor, cause the computing system to:
determine a plurality of memory operations associated with the data-flow graph,
randomly assign one or more of the plurality of memory operations to one or more of the plurality of memory controllers to generate a first allocation of the plurality of memory operations to the plurality of memory controllers, wherein the first allocation is to include an assignment of a first memory operation of the plurality of memory operations to the first memory controller,
generate a second allocation of the plurality of memory operations to the plurality of memory controllers based on the first allocation and through a random reassignment of the first memory operation from the first memory controller to the second memory controller, and
determine that the first allocation is to be stored as a permanent memory allocation based on a comparison of a first performance metric associated with the first allocation to a second performance metric associated with the second allocation.

2. The computing system of claim 1, wherein the instructions, when executed, cause the computing system to:
generate the second allocation through
a random selection of the first memory controller and the second memory controller, and
a reassignment of a second memory operation of the plurality of memory operations from the second memory controller to the first memory controller.

3. The computing system of claim 1, wherein the instructions, when executed, cause the computing system to:
generate the second allocation through
a random selection of the first memory operation, and
a random selection of the second memory controller to determine that the first memory operation is to be reallocated to the second memory controller.

4. The computing system of claim 1, wherein the instructions, when executed, cause the computing system to:
generate the second allocation through
a calculation of an execution time for each respective memory controller of the plurality of memory controllers to execute one or more of the memory operations that are assigned to the respective memory controller according to the first allocation;
identify that the first memory controller has a highest execution time of the execution times;
a random selection of the first memory operation, and
a random selection of the second memory controller to determine that the first memory operation is to be reallocated to the second memory controller.

5. The computing system of claim 1, wherein the spatial architecture is to include one or more of a configurable spatial architecture or a field-programmable gate array architecture.

6. The computing system of claim 1, wherein the instructions, when executed, cause the computing system to execute a simulated-annealing process that is to include:
a generation of the first allocation,
a determination of the first performance metric,
a determination of a permanent performance metric associated with the permanent memory allocation,
a determination that the first allocation is to be stored as the permanent memory allocation based on a comparison of the first performance metric to the permanent performance metric, and
a determination that the first performance metric is to be stored as the permanent performance metric based on the comparison.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
determine a plurality of memory operations associated with a data-flow graph that is to represent a computer code, wherein a spatial architecture is to execute the data-flow graph and the spatial architecture is to include a plurality of memory controllers, wherein the plurality of memory controllers includes a first memory controller and a second memory controller;
randomly assign one or more of the plurality of memory operations to one or more of the plurality of memory controllers to generate a first allocation of the plurality of memory operations to the memory controllers, wherein the first allocation is to include an assignment of a first memory operation of the plurality of memory operations to the first memory controller;
generate a second allocation of the plurality of memory operations to the plurality of memory controllers based on the first allocation and through a random reassignment of the first memory operation from the first memory controller to the second memory controller; and
determine that the first allocation is to be stored as a permanent memory allocation based on a comparison of a first performance metric associated with the first allocation to a second performance metric associated with the second allocation.

8. The apparatus of claim 7, wherein the logic coupled to the one or more substrates is to:
generate the second allocation through
a random selection of the first memory controller and the second memory controller, and
a reassignment of a second memory operation of the plurality of memory operations from the second memory controller to the first memory controller.

9. The apparatus of claim 7, wherein the logic coupled to the one or more substrates is to:
generate the second allocation through
a random selection of the first memory operation, and
a random selection of the second memory controller to determine that the first memory operation is to be reallocated to the second memory controller.

10. The apparatus of claim 7, wherein the logic coupled to the one or more substrates is to:
generate the second allocation through
a calculation of an execution time for each respective memory controller of the plurality of memory controllers to execute one or more of the memory operations that are assigned to the respective memory controller according to the first allocation,
identify that the first memory controller has a highest execution time of the execution times,
a random selection of the first memory operation, and a random selection of the second memory controller to determine that the first memory operation is to be reallocated to the second memory controller.

11. The apparatus of claim 7, wherein the spatial architecture is to include one or more of a configurable spatial architecture or a field-programmable gate array architecture.

12. The apparatus of claim 7, wherein the logic coupled to the one or more substrates is to execute a simulated-annealing process that is to include a generation of the first allocation,
a determination of the first performance metric,
a determination of a permanent performance metric associated with the permanent memory allocation,
a determination that the first allocation is to be stored as the permanent memory allocation based on a comparison of the first performance metric to the permanent performance metric, and
a determination that the first performance metric is to be stored as the permanent performance metric based on the comparison.

13. The apparatus of claim 7, wherein the logic coupled to the one or more substrates includes transistor channel regions that are positioned within the one or more substrates.

14. At least one computer readable storage medium comprising a set of instructions, which when executed by a computing device, cause the computing device to:
determine a plurality of memory operations associated with a data-flow graph that is to represent a computer code, wherein a spatial architecture is to execute the data-flow graph and the spatial architecture is to include a plurality of memory controllers, wherein the plurality of memory controllers includes a first memory controller and a second memory controller;
randomly assign one or more of the plurality of memory operations to one or more of the plurality of memory controllers to generate a first allocation of the plurality of memory operations to the memory controllers, wherein the first allocation is to include an assignment of a first memory operation of the plurality of memory operations to the first memory controller;
generate a second allocation of the plurality of memory operations to the plurality of memory controllers based on the first allocation and through a random reassignment of the first memory operation from the first memory controller to the second memory controller; and
determine that the first allocation is to be stored as a permanent memory allocation based on a comparison of a first performance metric associated with the first allocation to a second performance metric associated with the second allocation.

15. The at least one computer readable storage medium of claim 14, wherein the instructions, when executed, cause the computing device to:
generate the second allocation through
a random selection of the first memory controller and the second memory controller, and
a reassignment of a second memory operation of the plurality of memory operations from the second memory controller to the first memory controller.

16. The at least one computer readable storage medium of claim 14, wherein the instructions, when executed, cause the computing device to:
generate the second allocation through
a random selection of the first memory operation, and
a random selection of the second memory controller to determine that the first memory operation is to be reallocated to the second memory controller.

17. The at least one computer readable storage medium of claim 14, wherein the instructions, when executed, cause the computing device to:
generate the second allocation through
a calculation of an execution time for each respective memory controller of the plurality of memory controllers to execute one or more of the memory operations that are assigned to the respective memory controller according to the first allocation,
identify that the first memory controller has a highest execution time of the execution times,
a random selection of the first memory operation, and
a random selection of the second memory controller to determine that the first memory operation is to be reallocated to the second memory controller.

18. The at least one computer readable storage medium of claim 14, wherein the spatial architecture is to include one or more of a configurable spatial architecture or a field-programmable gate array architecture.

19. The at least one computer readable storage medium of claim 14, wherein the instructions, when executed, cause the computing device to execute a simulated-annealing process that is to include:
a generation of the first allocation,
a determination of the first performance metric,
a determination of a permanent performance metric associated with the permanent memory allocation,
a determination that the first allocation is to be stored as the permanent memory allocation based on a comparison of the first performance metric to the permanent performance metric, and
a determination that the first performance metric is to be stored as the permanent performance metric based on the comparison.

20. A method comprising:
determining a plurality of memory operations associated with a data-flow graph that represents a computer code, wherein a spatial architecture executes the data-flow graph and the spatial architecture includes a plurality of memory controllers, wherein the plurality of memory controllers includes a first memory controller and a second memory controller;
randomly assigning one or more of the plurality of memory operations to one or more of the plurality of memory controllers to generate a first allocation of the plurality of memory operations to the memory controllers, wherein the first allocation includes an assignment of a first memory operation of the plurality of memory operations to the first memory controller;
generating a second allocation of the plurality of memory operations to the plurality of memory controllers based on the first allocation and through a random reassignment of the first memory operation from the first memory controller to the second memory controller; and
determining that the first allocation is to be stored as a permanent memory allocation based on a comparison of a first performance metric associated with the first allocation to a second performance metric associated with the second allocation.

21. The method of claim 20, further comprising:
wherein the generating the second allocation includes randomly selecting the first memory controller and the second memory controller, reassigning a second memory operation of the plurality of memory operations from the second memory controller to the first memory controller.

22. The method of claim 20, further comprising:
wherein the generating the second allocation includes
randomly selecting the first memory operation
randomly selecting the second memory controller to determine that the first memory operation will be reallocated to the second memory controller.

23. The method of claim 20, further comprising:
wherein the generating the second allocation includes
calculating an execution time for each respective memory controller to execute one or more of the memory operations that are assigned to the respective memory controller according to the first allocation,
identifying that the first memory controller has a highest execution time of the execution times,
randomly selecting the first memory operation,
randomly selecting the second memory controller to determine that the first memory operation will be reallocated to the second memory controller.

24. The method of claim 20, wherein the spatial architecture is to include one or more of a configurable spatial architecture or a field-programmable gate array architecture.

25. The method of claim 20, the method further comprising executing a simulated-annealing process that is to include:
a generation of the first allocation,
a determination of the first performance metric,
a determination of a permanent performance metric associated with the permanent memory allocation,
a determination that the first allocation is to be stored as the permanent memory allocation based on a comparison of the first performance metric to the permanent performance metric, and
a determination that the first performance metric is to be stored as the permanent performance metric based on the comparison.

* * * * *